US012597389B2

(12) United States Patent
Feng et al.

(10) Patent No.: US 12,597,389 B2
(45) Date of Patent: Apr. 7, 2026

(54) PIXEL CIRCUIT, METHOD FOR DRIVING PIXEL CIRCUIT, DISPLAY SUBSTRATE, AND DISPLAY DEVICE

(71) Applicants: Hefei BOE Joint Technology Co., Ltd., Hefei (CN); BOE Technology Group Co., Ltd., Beijing (CN)

(72) Inventors: Xuehuan Feng, Beijing (CN); Yongqian Li, Beijing (CN)

(73) Assignees: Hefei BOE Joint Technology Co., Ltd., Hefei (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 18/995,554

(22) PCT Filed: Apr. 23, 2024

(86) PCT No.: PCT/CN2024/089299
§ 371 (c)(1),
(2) Date: Jan. 16, 2025

(87) PCT Pub. No.: WO2025/222370
PCT Pub. Date: Oct. 30, 2025

(65) Prior Publication Data
US 2025/0336352 A1 Oct. 30, 2025

(51) Int. Cl.
*G09G 3/3233* (2016.01)

(52) U.S. Cl.
CPC ... *G09G 3/3233* (2013.01); *G09G 2300/0426* (2013.01); *G09G 2300/043* (2013.01);
(Continued)

(58) Field of Classification Search
CPC ......... G09G 3/3233; G09G 2300/0426; G09G 2300/043; G09G 2300/0814;
(Continued)

(56) References Cited

U.S. PATENT DOCUMENTS 11,631,369 B2 * 4/2023 Lee .......................... G09G 3/32 345/76
12,039,931 B1 * 7/2024 Hu ....................... G09G 3/3233
(Continued)

*Primary Examiner* — Jeff Piziali
(74) *Attorney, Agent, or Firm* — Westman, Champlin & Koehler, P.A.

(57) ABSTRACT

A pixel circuit includes a driving unit including first, second, and third terminals, the second terminal being coupled to a first electrode of a light-emitting element; a first light-emitting control unit coupled between a first power line and the first terminal, configured to couple/decouple the first power line to/from the first terminal; a second light-emitting control unit coupled between the second terminal and the first electrode, configured to couple/decouple the second terminal to/from the first electrode; a threshold compensation unit coupled between the first terminal and the first electrode, configured to couple/decouple the first terminal to/from the first electrode; a first storage unit and a second storage unit coupled at a first node and in series between the third terminal and the first; a gating unit coupled between a first reference signal line and the first node, configured to couple/decouple the first reference signal line to/from the first node.

20 Claims, 16 Drawing Sheets

(52) U.S. Cl.
CPC ............... *G09G 2300/0814* (2013.01); *G09G 2300/0819* (2013.01); *G09G 2300/0852* (2013.01); *G09G 2310/08* (2013.01)

(58) Field of Classification Search
CPC ... G09G 2300/0819; G09G 2300/0852; G09G 2310/08
See application file for complete search history.

(56) References Cited

U.S. PATENT DOCUMENTS

| | | | | |
|---|---|---|---|---|
| 12,148,355 | B1 * | 11/2024 | Watsuda | G09G 3/2096 |
| 2013/0321375 | A1 * | 12/2013 | Ka | G09G 3/3233 345/212 |
| 2018/0084621 | A1 * | 3/2018 | Nathan | G09G 3/3233 |
| 2019/0035333 | A1 * | 1/2019 | Chen | G09G 3/3241 |
| 2019/0213944 | A1 * | 7/2019 | Zhou | G09G 3/3233 |
| 2021/0407433 | A1 * | 12/2021 | Wang | G09G 3/3258 |
| 2022/0180816 | A1 * | 6/2022 | Yuan | G09G 3/3266 |
| 2022/0246094 | A1 * | 8/2022 | Qin | G09G 3/3266 |
| 2022/0302240 | A1 * | 9/2022 | Zhang | H10K 59/131 |
| 2023/0059117 | A1 * | 2/2023 | Yang | G09G 3/3208 |
| 2023/0215314 | A1 * | 7/2023 | Ke | H10K 59/00 345/443 |
| 2024/0087518 | A1 * | 3/2024 | He | G09G 3/3266 |
| 2024/0212580 | A1 * | 6/2024 | Xu | G09G 3/32 |
| 2024/0233628 | A1 * | 7/2024 | Yuan | G09G 3/20 |
| 2025/0087139 | A1 * | 3/2025 | Park | G09G 3/3266 |
| 2025/0191523 | A1 * | 6/2025 | Zhang | G09G 3/3266 |
| 2025/0246126 | A1 * | 7/2025 | Cherng | G09G 3/3233 |

* cited by examiner

PIXEL CIRCUIT, METHOD FOR DRIVING PIXEL CIRCUIT, DISPLAY SUBSTRATE, AND DISPLAY DEVICE

CROSS REFERENCE TO RELATED APPLICATION(S)

This application is a Section 371 National Stage Application of International Application No. PCT/CN2024/089299, filed on Apr. 23, 2024, entitled "PIXEL CIRCUIT, METHOD FOR DRIVING PIXEL CIRCUIT, DISPLAY SUBSTRATE, AND DISPLAY DEVICE", not in English, the content of which is incorporated herein by reference in its entirety.

TECHNICAL FIELD

The present disclosure relates to a field of display technology, and in particular, to a pixel circuit, a method for driving a pixel circuit, a display substrate, and a display device.

BACKGROUND

Organic Light-emitting Diode (OLED) is an active light-emitting element with the advantages of self-luminescence, wide viewing angle, high contrast ratio, low power consumption, extremely high response rate, thinness, flexibility and low cost. At present, the driving current is provided to the light-emitting element through the pixel circuit, but the driving current in the pixel circuit is easily disturbed by the external DC power supply, resulting in reduced display effect.

SUMMARY

The present disclosure provides a pixel circuit, including: a driving unit including a first terminal, a second terminal and a third terminal, wherein the second terminal of the driving unit is coupled to a first electrode of a light-emitting element, and the driving unit is configured to provide a driving current to the light-emitting element in a light-emitting phase; a first light-emitting control unit coupled between a first power line and the first terminal of the driving unit, and configured to couple the first power line to the first terminal of the driving unit or decouple the first power line from the first terminal of the driving unit; a second light-emitting control unit coupled between the second terminal of the driving unit and the first electrode of the light-emitting element, and configured to couple the second terminal of the driving unit to the first electrode of the light-emitting element or decouple the second terminal of the driving unit from the first electrode of the light-emitting element; a threshold compensation unit coupled between the first terminal of the driving unit and the first electrode of the light-emitting element, and configured to couple the first terminal of the driving unit to the first electrode of the light-emitting element or decouple the first terminal of the driving unit from the first electrode of the light-emitting element; a first storage unit and a second storage unit, wherein the first storage unit and the second storage unit are coupled in series between the third terminal of the driving unit and the first electrode of the light-emitting element, and the first storage unit is coupled to the second storage unit at a first node; and a gating unit coupled between a first reference signal line and the first node, and configured to couple the first reference signal line to the first node or decouple the first reference signal line from the first node.

According to some exemplary embodiments, the pixel circuit further includes a first reset unit coupled between the gating unit and the first reference signal line, and wherein the first reset unit, the gating unit and the second terminal of the driving unit are coupled to each other at a second node; and the first reset unit is configured to couple the first reference signal line to the second node or decouple the first reference signal line from the second node.

According to some exemplary embodiments, the first reset unit includes: a first reset transistor, a first electrode of the first reset transistor is coupled to the first reference signal line, a second electrode of the first reset transistor is coupled to the second node, and a gate electrode of the first reset transistor is coupled to a first reset control line; and wherein the first reference signal line is configured to provide a second reference signal in a reset phase, and provide a first reference signal in a threshold compensation phase and a data writing phase.

According to some exemplary embodiments, the first reset unit is further coupled to a second reference signal line, and the first reset unit is further configured to couple the second reference signal line to the second node or decouple the second reference signal line from the second node.

According to some exemplary embodiments, the first reset unit includes: a first reset transistor and a second reset transistor; a first electrode of the first reset transistor is coupled to the first reference signal line, a second electrode of the first reset transistor is coupled to the second node, and a gate electrode of the first reset transistor is coupled to a first reset control line; and a first electrode of the second reset transistor is coupled to the second reference signal line, a second electrode of the second reset transistor is coupled to the second node, and a gate electrode of the second reset transistor is coupled to a second reset control line.

According to some exemplary embodiments, the gating unit includes a gating transistor, a first electrode of the gating transistor is coupled to the second node, a second electrode of the gating transistor is coupled to the first node, and a gate electrode of the gating transistor is coupled to a gating control line; wherein the gating control line and the first reset control line are integrated; or the gating control line and the first reset control line are insulated from each other and spaced apart.

According to some exemplary embodiments, the pixel circuit further includes an input unit coupled between a data line and the third terminal of the driving unit and configured to couple the data line to the third terminal of the driving unit or decouple the data line from the third terminal of the driving unit; and wherein the input unit is further coupled between a reset signal line and the third terminal of the driving unit, and the input unit is further configured to couple the reset signal line to the third terminal of the driving unit or decouple the reset signal line from the third terminal of the driving unit.

According to some exemplary embodiments, the input unit includes: an input transistor and a third reset transistor; a first electrode of the input transistor is coupled to the third terminal of the driving unit, a second electrode of the input transistor is coupled to the data line, and a gate electrode of the input transistor is coupled to an input control line; and a first electrode of the third reset transistor is coupled to the third terminal of the driving unit, a second electrode of the third reset transistor is coupled to the reset signal line, and a gate electrode of the third reset transistor is coupled to a third reset control line.

According to some exemplary embodiments, the threshold compensation unit includes: a threshold compensation transistor, a first electrode of the threshold compensation transistor is coupled to the first electrode of the light-emitting element, a second electrode of the threshold compensation transistor is coupled to the first terminal of the driving unit, and a gate electrode of the threshold compensation transistor is coupled to a threshold compensation control line; and wherein the third reset control line and the threshold compensation control line are integrated; or the third reset control line and the threshold compensation control line are insulated from each other and spaced apart.

According to some exemplary embodiments, the input unit includes: an input transistor, a first electrode of the input transistor is coupled to the third terminal of the driving unit, a second electrode of the input transistor is coupled to the reset signal line and the data line, and a gate electrode of the input transistor is coupled to an input control line.

According to some exemplary embodiments, the first light-emitting control unit includes: a first light-emitting control transistor, a first electrode of the first light-emitting control transistor is coupled to the first power line, a second electrode of the first light-emitting control transistor is coupled to the first terminal of the driving unit, and a gate electrode of the first light-emitting control transistor is coupled to a first light-emitting control line; and the second light-emitting control unit includes: a second light-emitting control transistor, a first electrode of the second light-emitting control transistor is coupled to the second terminal of the driving unit, a second electrode of the second light-emitting control transistor is coupled to the first electrode of the light-emitting element, and a gate electrode of the second light-emitting control transistor is coupled to a second light-emitting control line.

According to some exemplary embodiments, the first storage unit includes a first capacitor, a first electrode plate of the first capacitor is coupled to the third terminal of the driving unit, and a second electrode plate of the first capacitor is coupled to the first node; and the second storage unit includes a second capacitor, a first electrode plate of the second capacitor is coupled to the first node, and a second electrode plate of the second capacitor, the second light-emitting control unit, the threshold compensation unit and the first electrode of the light-emitting element are coupled to each other at a third node.

According to some exemplary embodiments, the pixel circuit further includes: a third light-emitting control unit coupled between the third node and the first electrode of the light-emitting element and configured to couple the third node to the first electrode of the light-emitting element or decouple the third node from the first electrode of the light-emitting element.

According to some exemplary embodiments, the third light-emitting control unit includes: a third light-emitting control transistor, a first electrode of the third light-emitting control transistor is coupled to the third node, a second electrode of the third light-emitting control transistor is coupled to the first electrode of the light-emitting element, and a gate electrode of the third light-emitting control transistor is coupled to a third light-emitting control line.

According to some exemplary embodiments, the driving unit includes: a driving transistor, and the driving transistor includes an oxide thin film transistor; a first electrode of the driving transistor serves as the first terminal of the driving unit, a second electrode of the driving transistor serves as the second terminal of the driving unit, and a gate electrode of the driving transistor serves as the third terminal of the driving unit.

According to some exemplary embodiments, the pixel circuit further includes a first substrate, the driving unit includes a driving transistor, the first light-emitting unit includes a first light-emitting control transistor, the second light-emitting control unit includes a second light-emitting control transistor, the threshold compensation unit includes a threshold compensation transistor, the gating unit includes a gating transistor, and the first storage unit includes a first capacitor; and an orthographic projection of the first light-emitting control transistor on the first substrate and an orthographic projection of the threshold compensation transistor on the first substrate are arranged in a first direction, and orthographic projections of the driving transistor, the first capacitor, the second light-emitting control transistor and the gating transistor on the first substrate are located between the orthographic projection of the first light-emitting control transistor on the first substrate and the orthographic projection of the threshold compensation transistor on the first substrate.

According to some exemplary embodiments, a second electrode of the first light-emitting control transistor is coupled to a second electrode of the threshold compensation transistor through a first connecting portion, and orthographic projections of the first light-emitting control transistor, the driving transistor, the first capacitor, the second light-emitting control transistor, the gating transistor and the threshold compensation transistor on the first substrate are located on a same side of an orthographic projection of the first connecting portion on the first substrate.

According to some exemplary embodiments, an orthographic projection of the driving transistor on the first substrate overlaps with an orthographic projection of the first capacitor on the first substrate.

According to some exemplary embodiments, the second storage unit includes a second capacitor, an orthographic projection of the first capacitor on the first substrate and an orthographic projection of the second capacitor on the first substrate are arranged in the first direction, and orthographic projections of the second light-emitting control transistor and the gating transistor on the first substrate are located between the orthographic projection of the first capacitor on the first substrate and the orthographic projection of the second capacitor on the first substrate.

According to some exemplary embodiments, the orthographic projection of the threshold compensation transistor on the first substrate overlaps with the orthographic projection of the second capacitor on the first substrate.

According to some exemplary embodiments, an orthographic projection of the gating transistor on the first substrate is located between an orthographic projection of the second light-emitting control transistor on the first substrate and an orthographic projection of the driving transistor on the first substrate; and a second electrode of the driving transistor, a first electrode of the second light-emitting control transistor and a second electrode of the driving transistor are coupled through a second connecting portion, the orthographic projection of the gating transistor on the first substrate is located between an orthographic projection of the second connecting portion on the first substrate and the orthographic projection of the first connecting portion on the first substrate, and a first electrode of the gating transistor is coupled to the second connecting portion through a third connecting portion.

According to some exemplary embodiments, the pixel circuit further includes an input unit, the input unit further includes an input transistor, an orthographic projection of the input transistor on the first substrate is located on a side of an orthographic projection of the first capacitor on the first substrate away from the orthographic projection of the first light-emitting control transistor on the first substrate, and an orthographic projection of the gating transistor on the first substrate is located between the orthographic projection of the input transistor on the first substrate and the orthographic projection of the first connecting portion on the first substrate.

According to some exemplary embodiments, the input unit further includes a third reset transistor, an orthographic projection of the third reset transistor on the first substrate is located on a side of the orthographic projection of the first capacitor on the first substrate facing the orthographic projection of the first light-emitting control transistor on the first substrate, and the orthographic projection of the first light-emitting control transistor on the first substrate is located between the orthographic projection of the third reset transistor on the first substrate and the orthographic projection of the first connecting portion on the first substrate.

According to some exemplary embodiments, the second capacitor includes a first electrode plate and a second electrode plate, the second electrode plate is located on a side of the first electrode plate facing the first substrate, the first electrode plate of the second capacitor is provided with a first opening, and the first opening exposes the second electrode plate of the second capacitor; an orthographic projection of the first opening on the first substrate and the orthographic projection of the threshold compensation transistor on the first substrate are arranged in a second direction intersecting the first direction, a first electrode of the threshold compensation transistor is coupled to a second electrode of the second light-emitting control transistor and coupled to a fourth connecting portion, and the second connecting portion is located on a side of the first electrode plate of the second capacitor away from the first substrate; and a part of the fourth connecting portion passes through the first opening and is coupled to the second electrode plate of the second capacitor.

According to some exemplary embodiments, the pixel circuit further includes a first reset unit, the first reset unit further includes a first reset transistor, an orthographic projection of the first reset transistor on the first substrate is located on a side of the orthographic projection of the second capacitor on the first substrate facing the orthographic projection of the first light-emitting control transistor on the first substrate, and the orthographic projection of the first reset transistor on the first substrate and the orthographic projection of the first opening on the first substrate are arranged in the first direction.

In another aspect, a display substrate is provided, which includes the pixel circuit described above.

In another aspect, a display device is provided, which includes the display substrate described above.

In another aspect, a method for driving the pixel circuit is provided, which is applied to the pixel circuit described above, and the method includes: in a threshold compensation phase, providing an invalid signal to the first light-emitting control unit so that the first power line is decoupled from the first terminal of the driving unit by the first light-emitting control unit, providing an invalid signal to the second light-emitting control unit so that the second terminal of the driving unit is decoupled from the first electrode of the light-emitting element by the second light-emitting control unit, providing a valid signal to the threshold compensation unit so that the first terminal of the driving unit is coupled to the first electrode of the light-emitting element by the threshold compensation unit, and providing a valid signal to the gating unit so that the first reference signal line is coupled to the first node by the gating unit; in a data writing phase, providing an invalid signal to the threshold compensation unit so that the first terminal of the driving unit is decoupled from the first electrode of the light-emitting element by the threshold compensation unit; and in a light-emitting phase, providing a valid signal to the first light-emitting control unit so that the first power line is coupled to the first terminal of the driving unit by the first light-emitting control unit, and providing a valid signal to the second light-emitting control unit so that the second terminal of the driving unit is coupled to the first electrode of the light-emitting element by the second light-emitting control unit, and providing an invalid signal to the gating unit so that the first reference signal line is decoupled from the first node by the gating unit.

BRIEF DESCRIPTION OF THE DRAWINGS

The above contents and other purposes, features and advantages of the present disclosure will become clearer through the following description of embodiments of the present disclosure with reference to the accompanying drawings, in which.

DETAILED DESCRIPTION OF EMBODIMENTS

Figure 1:
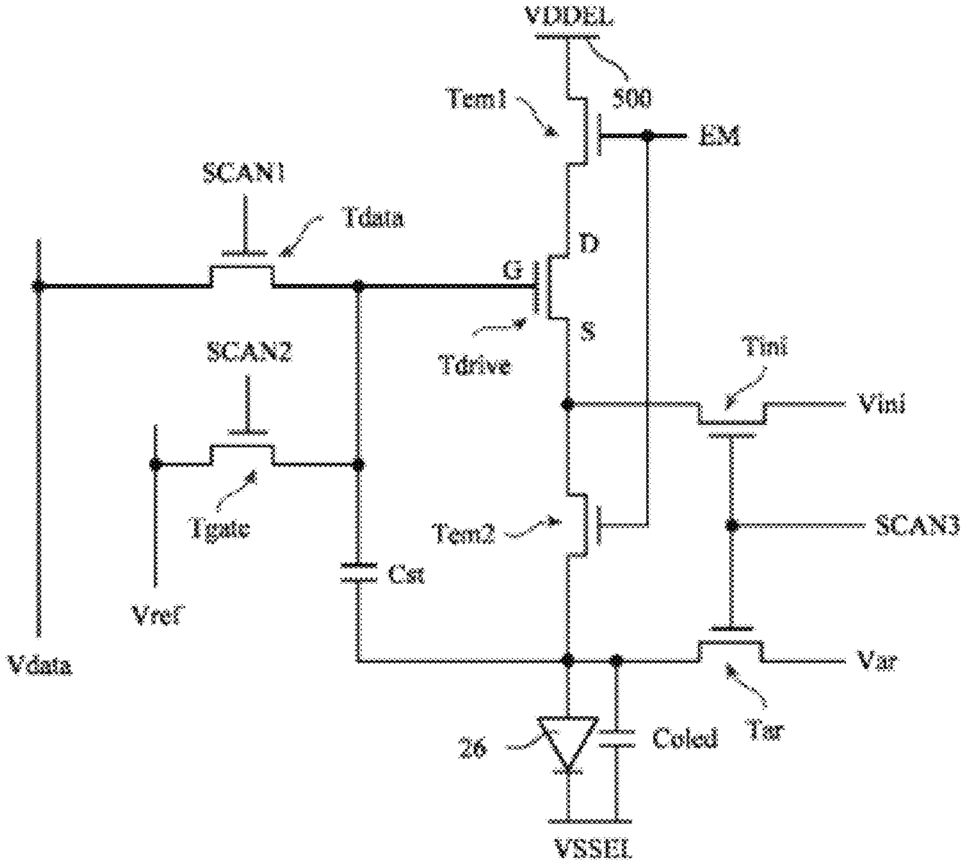
FIG. 1 schematically shows a schematic diagram of a pixel circuit in a comparative embodiment.

In order to make the purpose, technical solutions and advantages of embodiments of the present disclosure clear, the technical solutions in embodiments of the present disclosure will be clearly and completely described in conjunction with the drawings in embodiments of the present disclosure. The described embodiments constitute only a subset of embodiments contemplated in view of the present disclosure, and not all of such embodiments. Based on the described embodiments of the present disclosure, further embodiments obtained by those skilled in the art without creative work are within the protection scope of the present disclosure.

It should be noted that, in the drawings, for clarity and/or description purposes, a size and relative size of an element may be enlarged, the size and relative size of each element need not be limited to those shown in the drawings. In the specification and drawings, the same or similar reference numerals indicate the same or similar components.

When an element is described as being "on", "coupled to" or "connected to" another element, the element may be directly on the another element, directly coupled to the another element or directly connected to the another element, or an intermediate element may be present. However, when an element is described as being "directly on", "directly coupled to" or "directly connected to" another element, there is no intermediate element. Other terms and/or expressions used to describe the relationship between elements should be interpreted in a similar manner, for example, "between" and "directly between", "adjacent" and "directly adjacent", "on" and "directly on" etc. In addition, the term "couple" may refer to a physical couple, an electrical couple, a communication couple, and/or a fluid couple. In addition, X axis, Y axis, and Z axis are not limited to the three axes of the Cartesian coordinate system, which may be interpreted in broader meaning. For example, the X axis, the Y axis, and the Z axis may be perpendicular to each other, or may represent different directions that are not perpendicular to each other. For the purpose of the present disclosure, "at least one of X, Y, or Z" and "at least one selected from a group consisting of X, Y, and Z" may be interpreted as only X, only Y, only Z, or any combination of two or more of X, Y, and Z such as XYZ, XY, YZ, and ZZ. As shown in the present disclosure, the term "and/or" includes any and all combinations of one or more of the related items.

It should be noted that although the terms "first", "second", etc. may be used to describe various components, members, elements, regions, layers and/or portions, these components, components, elements, regions, layers and/or portions should not be limited by these terms. Actually, the terms are used to distinguish one component, member, element, region, layer, and/or portion from another one. Thus, for example, a first component, a first member, a first element, a first region, a first layer, and/or a first portion described below may be referred to as a second component, a second member, a second element, a second region, a second layer and/or a second portion, which does not depart from the teachings of this disclosure.

For the convenience of description, the spatial relationship terms, for example, "upper", "lower", "left", "right", etc. may be used to describe the relationship between one element or feature and another element or feature as shown in figures. It should be understood that, in addition to an orientation described in figures, the spatial relationship terms include other different orientations of a device in operation. For example, if the device in figures is turned upside down, elements described as "below" or "lower" other elements or features will be oriented "on" or "upper" other elements or features.

In the present disclosure, the terms "substantially", "approximately", "roughly", "about" and other similar terms are used as approximate terms rather than as terms of degree, and these terms explain a inherent deviation of a measured value or a calculated value recognized by those skilled in the art. Taking into factors such as process fluctuations, measurement problems, and errors related to the measurement of specific quantities (i.e. the limitations of the measurement system), the "substantially" or "approximately" includes a stated value and means that a specific value determined by those skilled in the art is within an acceptable deviation range. For example, "approximately" may mean within one or more standard deviations, or within ±30%, ±20%, ±10%, ±5% of the stated value.

It should be noted that, in the present disclosure, the expression "same layer" refers to that a film layer used to form a specific pattern is formed by the same film forming process, and then the same mask is used to pattern the film layer through one patterning process to form a layer structure. Depending on different specific patterns, the one patterning process may include multiple exposure, development or etching processes, and the specific pattern in the formed layer structure may be continuous or discontinuous. That is, a plurality of elements, components, structures and/or portions located in the "same layer" are made of the same material and formed by the same patterning process. Generally, the plurality of elements, components, structures and/or portions located in the "same layer" have approximately the same thickness.

Those skilled in the art should understand that, in the present disclosure, unless otherwise specified, the expression "height" or "thickness" refers to a size of a surface of each film layer arranged in a direction perpendicular to a display substrate, that is, the size in a light-emission direction of the display substrate, or the size in a normal direction of the display device.

FIG. 1 schematically shows a schematic diagram of a pixel circuit in a comparative embodiment.

Referring to FIG. 1, in the comparative embodiment, the pixel circuit includes a first transistor Tdata, a second transistor Tgate, a third transistor Tem1, a fourth transistor Tem2, a fifth transistor Tini, a sixth transistor Tar, a driving transistor Tdrive, and a first capacitor Cst.

A first electrode of the first transistor Tdata is coupled to a data line Vdata, a second electrode of the first transistor Tdata is coupled to a gate electrode G of the driving transistor Tdrive, a second electrode of the second transistor Tgate and a first electrode plate of the first capacitor Cst, and a gate electrode of the first transistor Tdata is coupled to a first scan line SCAN1. A first electrode of the second transistor Tgate is coupled to a reset signal line Vref, and a gate electrode of the second transistor Tgate is coupled to a second scan line SCAN2. A first electrode of the third transistor Tem1 is coupled to a first power line VDDEL, a second electrode of the third transistor Tem1 is coupled to a first electrode D of the driving transistor Tdrive, and a gate electrode of the third transistor Tem1 is coupled to a first light-emitting control line EM1. A first electrode of the fourth transistor Tem2 is coupled to a second electrode plate of the first capacitor Cst, a second electrode S of the driving transistor Tdrive, and a second electrode of the fifth transistor Tini, a second electrode of the fourth transistor Tem2 is coupled to a first electrode of the light-emitting element 26 and a second electrode of the sixth transistor Tar, and a gate electrode of the fourth transistor Tem2 is coupled to the second light-emitting control line EM2. A first electrode of the fifth transistor Tini is coupled to a first reference signal line Vini, and a gate electrode of the fifth transistor Tini is coupled to a third scan line SCAN3. The first electrode of the sixth transistor Tar is coupled to the second reference signal Var, and the gate electrode is coupled to the third scan line SCAN3. A second electrode of the light-emitting element 26 is coupled to a second power line VSSEL, and the light-emitting element 26 is coupled in parallel with a light-emitting capacitor Coled.

In the above circuit, in a light-emitting phase, the driving transistor Tdrive may provide a corresponding driving current to the light-emitting element 26 according to the gate voltage of the driving transistor Tdrive. When outputting the driving current, the driving current is proportional to [Coled'/(Cst'+Coled')], if the capacitance of the light-emitting capacitor Coled is less than the capacitance of the first capacitor Cst, the driving current will decay, Coled' represents the capacitance of the light-emitting capacitor Coled, and Cst' represents the capacitance of the first capacitor Cst.

Figure 2:
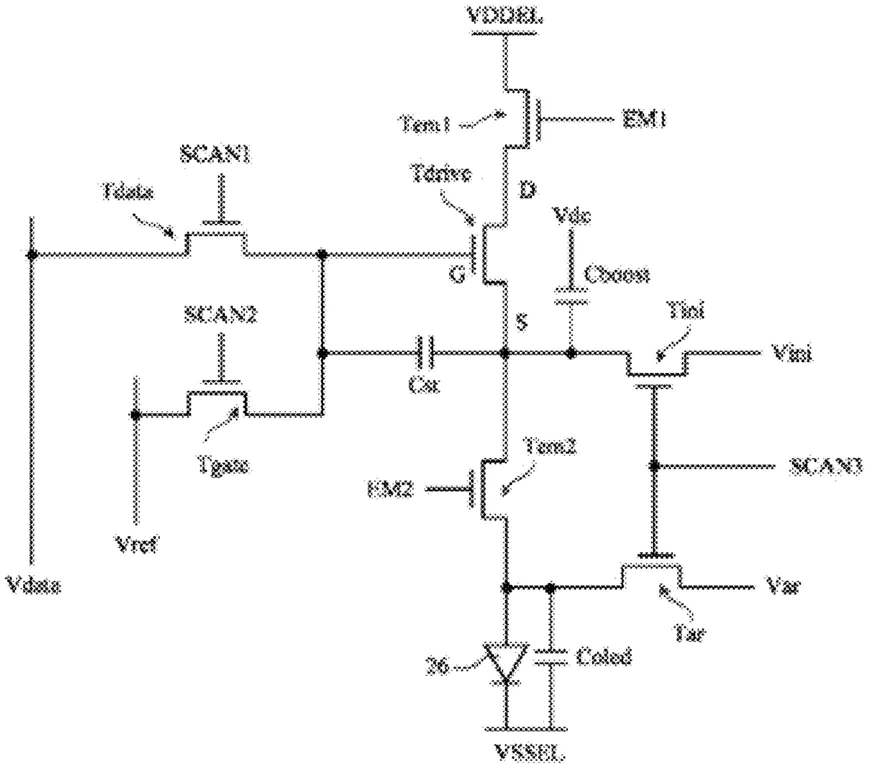
FIG. 2 schematically shows a schematic diagram of a pixel circuit in another comparative embodiment.

FIG. 2 schematically shows a schematic diagram of a pixel circuit in another comparative embodiment.

Referring to FIG. 2, in the comparative embodiment, a second capacitor Cboost is added. A first electrode plate of the second capacitor Cboost is coupled to the second electrode S of the driving transistor Tdrive, the second electrode plate of the first capacitor Cst, the second electrode of the fifth transistor Tini, and the first electrode of the fourth transistor Tem2. A second electrode plate of the second capacitor Cboost is coupled to a DC power supply Vdc. Thus, the current driving may be proportional to [(Coled'+Cboost')/(Cst'+Coled'+Cboost')]. By properly adjusting the size of the capacitance of the second capacitor Cboost, the attenuation of the driving current may be reduced. Therefore, the second capacitor Cboost is also referred to as a current boost capacitor. Coled' represents the capacitance of the light-emitting capacitor Coled, Cst' represents the capacitance of the first capacitor Cst, and Cboost' represents the capacitance of the second capacitor Cboost.

As the second capacitor Cboost is always coupled to the DC power supply Vdc, the fluctuation of the DC power supply Vdc in the light-emitting phase will cause the gate voltage of the driving transistor Tdrive to be unstable, thereby affecting the driving current.

In view of this, embodiments of the present disclosure provide a pixel circuit, and the pixel circuit in embodiments includes: a driving unit, a first light-emitting control unit, a second light-emitting control unit, a threshold compensation unit, a first storage unit, a second storage unit, and a gating unit.

The driving unit includes a first terminal, a second terminal and a third terminal, the second terminal of the driving unit is coupled to a first electrode of a light-emitting element, and the driving unit is used to provide a driving current to the light-emitting element in a light-emitting phase. The first light-emitting control unit is coupled between a first power line and the first terminal of the driving unit, and used to couple the first power line to the first terminal of the driving unit or decouple the first power line from the first terminal of the driving unit. The second light-emitting control unit is coupled between the second terminal of the driving unit and the first electrode of the light-emitting element, and used to couple the second terminal of the driving unit to the first electrode of the light-emitting element or decouple the second terminal of the driving unit from the first electrode of the light-emitting element. The threshold compensation unit is coupled between the first terminal of the driving unit and the first electrode of the light-emitting element, and used to couple the first terminal of the driving unit to the first electrode of the light-emitting element or decouple the first terminal of the driving unit from the first electrode of the light-emitting element. The first storage unit and the second storage unit are coupled in series between the third terminal of the driving unit and the first electrode of the light-emitting element, and the first storage unit is coupled to the second storage unit at a first node. The gating unit is coupled between a first reference signal line and the first node, and used to couple the first reference signal line to the first node or decouple the first reference signal line from the first node.

Compared with the pixel circuit in the comparative embodiment, the pixel circuit in embodiments of the present disclosure may also achieve threshold compensation and reduce the attenuation of the driving current. On this basis, in the pixel circuit in embodiments of the present disclosure, any of the first storage unit and the second storage unit is no longer always coupled to the external DC power supply. Thus, the external DC power supply may be prevented from interfering with the gate electrode (i.e., the second node) of the driving transistor in the light-emitting phase, thereby improving the stability of the driving current.

The pixel circuit in embodiments of the present disclosure will be described in detail below with reference to FIGS. 3 to 20.

Figure 3:
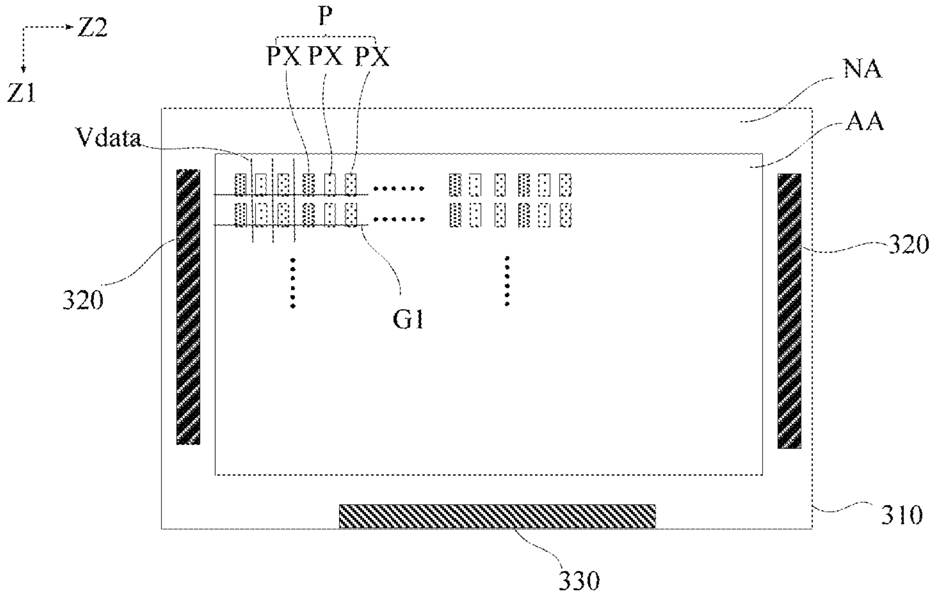
FIG. 3 schematically shows a plan view of a display substrate in embodiments of the present disclosure.

In an example, the pixel circuit in embodiments of the present disclosure may be applied to a display substrate, and the display substrate may be an OLED display substrate. FIG. 3 schematically shows a plan view of a display substrate in embodiments of the present disclosure. Referring to FIG. 3, the display substrate may include: a display region AA and a peripheral region NA located on at least one side of the display region AA. The display region AA may have various shapes. For example, the display region AA may be provided in various shapes such as a polygon (e.g., a rectangle) of a closed shape including straight sides, a circle, an ellipse, etc. including curved sides, and a semi-circle, a semi-ellipse, etc. including straight sides and curved sides. In embodiments of the present disclosure, the display region AA is provided as a region having a quadrilateral shape including straight sides, and it should be understood that this is merely an exemplary embodiment of the present disclosure, and not a limitation of the present disclosure.

The display substrate may further include a base substrate 310 and a plurality of pixel units P arranged on the base substrate 310 and located in the display region AA, and the plurality of pixel units P may be arranged in an array in a third direction Z1 and a fourth direction Z2. The third direction Z1 intersects with the fourth direction Z2. For example, the third direction Z1 may include the vertical direction in FIG. 3, and the fourth direction Z2 may include the horizontal direction in FIG. 3, that is, the third direction Z1 and the fourth direction Z2 are perpendicular to each other.

Each pixel unit P may include a plurality of sub-pixels PX. For example, the pixel unit P may include a first sub-pixel, a second sub-pixel, and a third sub-pixel. In an example, the first sub-pixel, the second sub-pixel, and the third sub-pixel may be set as a red sub-pixel, a green sub-pixel, and a blue sub-pixel, respectively.

The plurality of sub-pixels PX may be arranged in an array in the third direction Z1 and the fourth direction Z2, but embodiments of the present disclosure are not limited thereto. For the convenience of description, in embodiments of the present disclosure, a plurality of sub-pixels PX arranged in the third direction Z1 is referred to as a column of sub-pixels PX, and a plurality of sub-pixels PX arranged in the fourth direction Z2 is referred to as a row of sub-pixels PX.

The display substrate further includes a plurality of first control lines G1 and a plurality of data lines Vdata arranged on the base substrate 310 and at least located in the display region AA. The plurality of data lines Vdata extend in the third direction Z1, and the plurality of first control lines G1 extend in the fourth direction Z2. One sub-pixel PX is coupled to one data line Vdata and one first control line G1. In an example, the sub-pixels PX in the same row are coupled to the same first control line G1, the sub-pixels PX in different rows are coupled to different first control lines G1, the sub-pixels PX in the same column are coupled to the same data line Vdata, and the sub-pixels PX in different columns are coupled to different data lines Vdata.

The peripheral region NA may be arranged at least one side of the display region AA. For example, the peripheral region NA may surround the display region AA. In embodiments of the present disclosure, the peripheral region NA may include a vertical portion extending in the third direction Z1 and a horizontal portion extending in the fourth direction Z2.

The display substrate may further include a gate driving circuit 320 and a display binding terminal 330 arranged on the base substrate 310 and located in the peripheral region NA. For example, the gate driving circuit 320 may be located on at least one side of the display region AA. In the embodiment shown in FIG. 3, the gate driving circuit 320 is located on the left and right sides of the display region AA. It should be noted that the left and right sides may refer to: "the left and right sides of the display substrate (screen) viewed by the human eye when displayed". For example, the display binding terminal 330 may be located on at least one side of the display region AA. In the embodiment shown in FIG. 3, the display binding terminal 330 is located on the lower side of the display region AA. It should be noted that the lower side may refer to: "the lower side of the display substrate (screen) viewed by the human eye when displayed". The display binding terminal 330 is used to bind with a display driving component. In an example, the display driving component may include devices such as a flexible circuit board and a display driving chip. The display binding terminal 330 may be coupled to devices such as a printed circuit board located on the back side of the display substrate through the display driving component. The display binding terminal 330 is also coupled to the signal line in the display region AA (such as the data line Vdata described above), so that the electrical signal on the printed circuit board may be transmitted to the corresponding signal line in the display region AA through the display binding terminal 330, and then transmitted to the corresponding sub-pixel PX to implement the display function.

It should be noted that, although FIG. 3 shows that the gate driving circuit 320 is located on the left and right sides of the display region AA, and the display binding terminal 330 is located on the lower side of the display region AA, embodiments of the present disclosure are not limited thereto, the gate driving circuit 320 and the display binding terminal 330 may be located at any suitable position in the peripheral region NA.

In embodiments of the present disclosure, the gate driving circuit 320 may adopt the GOA technology, i.e., Gate Driver on Array. In the GOA technology, the gate driving circuit 320 is directly arranged on the array substrate to replace the external chip. Each GOA unit serves as a stage of shift register, and each stage of the shift register is coupled to a first control line G1. The scanning signals are output in turn through various stages of the shift registers to implement the line-by-line scanning of the sub-pixels PX. In some embodiments, each stage of the shift register may also be coupled to a plurality of first control lines G1, which may adapt to the development trend of high resolution and narrow frame of the display substrate.

In an example, the sub-pixel PX includes a light-emitting element OLED and a pixel circuit DR. The pixel circuit DR is used to provide a corresponding driving current to the light-emitting element OLED based on a data voltage signal on a data line Vdata in one frame period, so that the light-emitting element OLED emits light, and a corresponding picture is displayed.

Figure 4:
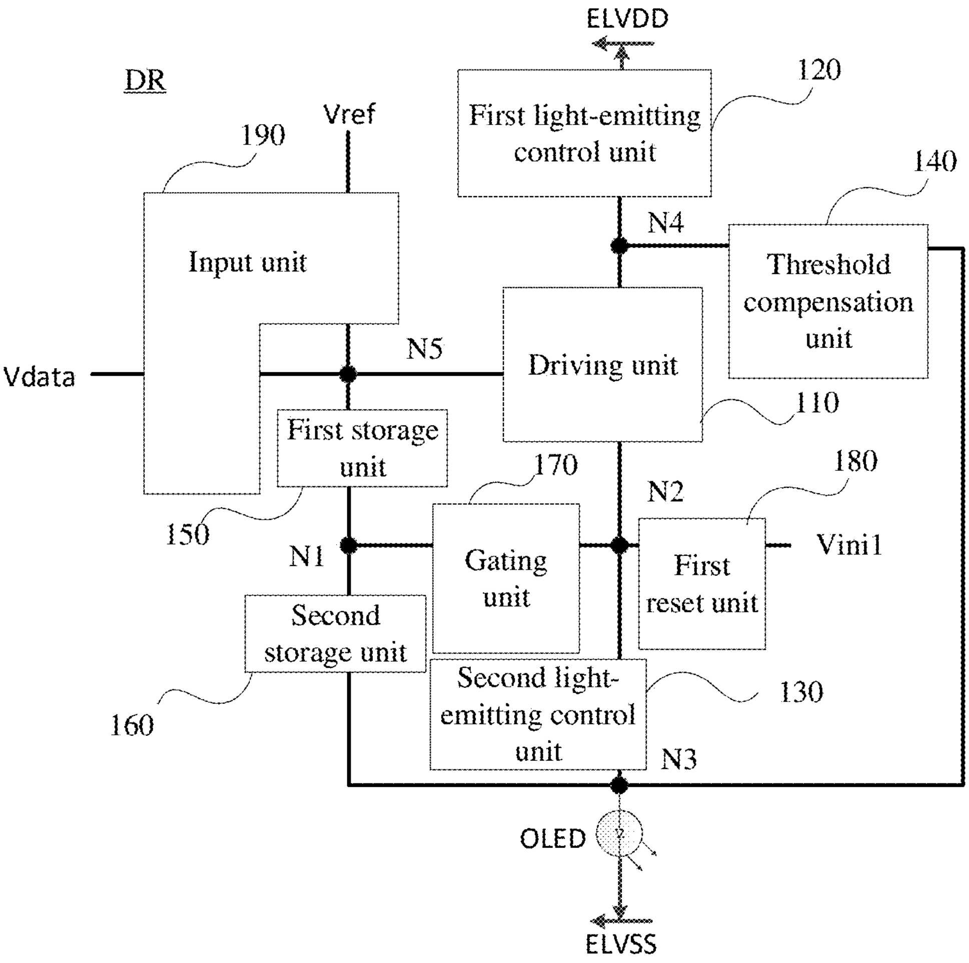
FIG. 4 schematically shows a schematic diagram of a pixel circuit in embodiments of the present disclosure.

FIG. 4 schematically shows a schematic diagram of a pixel circuit DR in embodiments of the present disclosure. Referring to FIG. 4, the pixel circuit DR in embodiments of the present disclosure includes a driving unit 110, a first light-emitting control unit 120, a second light-emitting control unit 130, a threshold compensation unit 140, a first storage unit 150, a second storage unit 160, and a gating unit 170.

The driving unit 110 includes a first terminal, a second terminal and a third terminal, the second terminal of the driving unit 100 is coupled to a first electrode of a light-emitting element OLED, and the driving unit 100 is used to provide a driving current to the light-emitting element OLED in a light-emitting phase. The first light-emitting control unit 120 is coupled between a first power line ELVDD and the first terminal of the driving unit 100, and the first light-emitting control unit is used to couple the first power line ELVDD to the first terminal of the driving unit 100 or decouple the first power line ELVDD from the first terminal of the driving unit 100. The second light-emitting control unit 130 is coupled between the second terminal of the driving unit 110 and the first electrode of the light-emitting element OLED, the second light-emitting control unit 130 is used to couple the second terminal of the driving unit 110 to the first electrode of the light-emitting element OLED or decouple the second terminal of the driving unit 110 from the first electrode of the light-emitting element OLED. The threshold compensation unit 140 is coupled between the first terminal of the driving unit 110 and the first electrode of the light-emitting element OLED, and the threshold compensation unit 140 is used to couple the first terminal of the driving unit 110 to the first electrode of the light-emitting element OLED or decouple the first terminal of the driving unit 110 from the first electrode of the light-emitting element OLED. The first storage unit 150 and the second storage unit 160 are coupled in series between the third terminal of the driving unit 110 and the first electrode of the light-emitting element OLED, and the first storage unit 150 is coupled to the second storage unit 160 at a first node N1. The gating unit 170 is coupled between a first reference signal line Vini1 and the first node N1, and the gating unit 170 is used to couple the first reference signal line Vini1 to the first node N1 or decouple the first reference signal line Vini1 from the first node N1.

In an example, a second electrode of the light-emitting element OLED is coupled to a second power line ELVSS. The driving unit 110 may include a driving transistor DT, and the driving transistor DT may provide a driving current to the light-emitting element OLED according to the gate voltage of the driving transistor DT.

In an example, the first light-emitting control unit 120, the second light-emitting control unit 130, the threshold compensation unit 140, and the gating unit 170 may include components with a switching function, and at least one of the first light-emitting control unit 120, the second light-emitting control unit 130, the threshold compensation unit 140, or the gating unit 170 includes at least a first terminal, a second terminal, and a control terminal, and the control terminal is used to couple the first terminal to the second terminal or decouple the first terminal from the second terminal. For example, at least one of the first light-emitting control unit 120, the second light-emitting control unit 130, the threshold compensation unit 140, or the gating unit 170 may include a transistor, a first electrode of the transistor may serve as the above-described first terminal, a second electrode of the transistor may serve as the above-described second terminal, and a gate electrode of the transistor may serve as the above-described control terminal.

In an example, the transistor in the present disclosure includes a gate electrode, a first electrode, and a second electrode. The first electrode may be coupled to the second electrode or the first electrode may be decoupled from the second electrode by controlling the voltage of the gate electrode. The first electrode may be a source electrode, and the second electrode may be a drain electrode; or the first electrode may be a drain electrode, and the second electrode may be a source electrode. The source electrode and the drain electrode may be interchanged according to actual desires. For a P-type transistor, a valid signal refers to a signal at low level, and an invalid signal refers to a signal at high level. For example, when the gate electrode is at high level, the first electrode and the second electrode are decoupled, and when the gate electrode is at low level, the first electrode and the second electrode are coupled. For an N-type transistor, a valid signal refers to a signal at high level, and an invalid signal refers to a signal at low level. For example, when the gate electrode is at high level, the first electrode and the second electrode are coupled; when the gate electrode is at low level, the first electrode and the second electrode are decoupled.

For clarity, unless otherwise specified, the following takes each transistor as an example of an N-type transistor to describe the pixel circuit DR in embodiments of the present disclosure. Accordingly, the valid signal in the following refers to a signal at high level, and the invalid signal refers to a signal at low level.

In an example, the second terminal of the first light-emitting control unit 120 is coupled to the first terminal of the driving unit 110. For example, the second terminal of the first light-emitting control unit 120 is coupled to the first electrode of the driving transistor DT at the fourth node N4. The first terminal of the first light-emitting control unit 120 is coupled to the first power line ELVDD, and the control terminal of the first light-emitting control unit 120 is coupled to the first light-emitting control line EM1. Thus, by selectively providing a valid/invalid signal to the first light-emitting control line EM1, the first power line ELVDD may be coupled to the fourth node N4 or the first power line ELVDD may be decoupled from the fourth node N4, and then the first power line ELVDD may be coupled to the first terminal of the driving unit 110 or the first power line ELVDD may be decoupled from the first terminal of the driving unit 110. For example, one frame period includes a threshold compensation phase and a light-emitting phase. In the threshold compensation phase, an invalid signal is provided to the first light-emitting control line EM1 so that the first power line ELVDD is decoupled from the first terminal of the driving unit 110 by the first light-emitting control unit 120. In the light-emitting phase, a valid signal is provided to the first light-emitting control line EM1, so that the first power line ELVDD is coupled to the fourth node N4 by the first light-emitting control unit 120.

In an example, the first terminal of the second light-emitting control unit 130 is coupled to the second terminal of the driving unit 110. For example, the first terminal of the second light-emitting control unit 130 is coupled to the second electrode of the driving transistor DT at the second node N2. The second terminal of the second light-emitting control unit 130 is coupled to the first electrode of the light-emitting element OLED at the third node N3, and the control terminal of the second light-emitting control unit 130 is coupled to the second light-emitting control line EM2. Thus, by selectively providing a valid/invalid signal to the second light-emitting control line EM2, the second node N2 may be coupled to the third node N3 or the second node N2 may be decoupled from the third node N3, and then the second terminal of the driving unit 110 may be coupled to the first electrode of the light-emitting element OLED or the second terminal of the driving unit 110 may be decoupled from the first electrode of the light-emitting element OLED. For example, in the threshold compensation phase, an invalid signal is provided to the second light-emitting control line EM2, so that the second terminal of the driving unit 110 is decoupled from the first electrode of the light-emitting element OLED by the second light-emitting control unit 130. In the light-emitting phase, a valid signal is provided to the second light-emitting control line EM2, so that the second terminal of the driving unit 110 is coupled to the first electrode of the light-emitting element OLED by the second light-emitting control unit 130.

In an example, the first terminal of the threshold compensation unit 140 is coupled to the third node N3 and thus coupled to the first electrode of the light-emitting element OLED. The second terminal of the threshold compensation unit 140 is coupled to the fourth node N4 and thus coupled to the first terminal of the driving unit 110. The control terminal of the threshold compensation unit 140 is coupled to the threshold compensation control line G3. Thus, by selectively providing a valid/invalid signal to the threshold compensation control line G3, the fourth node N4 may be coupled to the third node N3 or the fourth node N4 may be decoupled from the third node N3, that is, the first terminal of the driving unit 110 may be coupled to the first electrode of the light-emitting element OLED or the first terminal of the driving unit 110 may be decoupled from the first electrode of the light-emitting element OLED. For example, in the threshold compensation phase, a valid signal is provided to the threshold compensation control line G3, so that the first terminal of the driving unit 110 is coupled to the first electrode of the light-emitting element OLED by the threshold compensation unit 140. In the light-emitting phase, an invalid signal is provided to the threshold compensation control line G3, so that the first terminal of the driving unit 110 is decoupled from the first electrode of the light-emitting element OLED by the threshold compensation unit 140.

In an example, each of the first storage unit 150 and the second storage unit 160 may include a capacitor. For example, the first storage unit 150 includes a first capacitor C1, and the second storage unit 160 may include a second capacitor C2, and the first electrode plate of the first capacitor C1 is coupled to the third terminal of the driving unit 110 at the fifth node N5. The second electrode plate of the second capacitor C2 is coupled to the third node N3 and thus coupled to the first electrode of the light-emitting element OLED. The second electrode plate of the first capacitor C1 is coupled to the first electrode plate of the second capacitor C2 at the first node N1. Through the first capacitor C1 and the second capacitor C2, the driving current output by the driving transistor DT may be proportional to [(C3'+C2')/(C1'+C2'+C3')], thereby reducing the attenuation of the driving current. C1' represents the capacitance of the first capacitor C1, C2' represents the capacitance of the second capacitor C2, and C3' represents the capacitance of the light-emitting capacitor (not shown in the figure) coupled in parallel with the light-emitting element OLED.

In an example, the first terminal of the gating unit 170 is coupled to the first reference signal line Vini1, and the first reference signal line Vini1 may provide a constant direct-current (DC) signal. The second terminal of the gating unit 170 is coupled to the first node N1, and the control terminal of the gating unit 170 is coupled to the gating control line G4. Thus, by selectively providing a valid/invalid signal to the gating control line G4, the first reference signal line Vini1 may be coupled to the first node N1 or the first reference signal line Vini1 may be decoupled from the first node N1. For example, in the threshold compensation phase, a valid signal is provided to the gating control line G4, so that the first reference signal line Vini1 is coupled to the first node N1 by the gating unit 170. In the light-emitting phase, an invalid signal is provided to the gating control line G4, so that the first reference signal line Vini1 is decoupled from the first node N1 by the gating unit 170.

Figure 5:
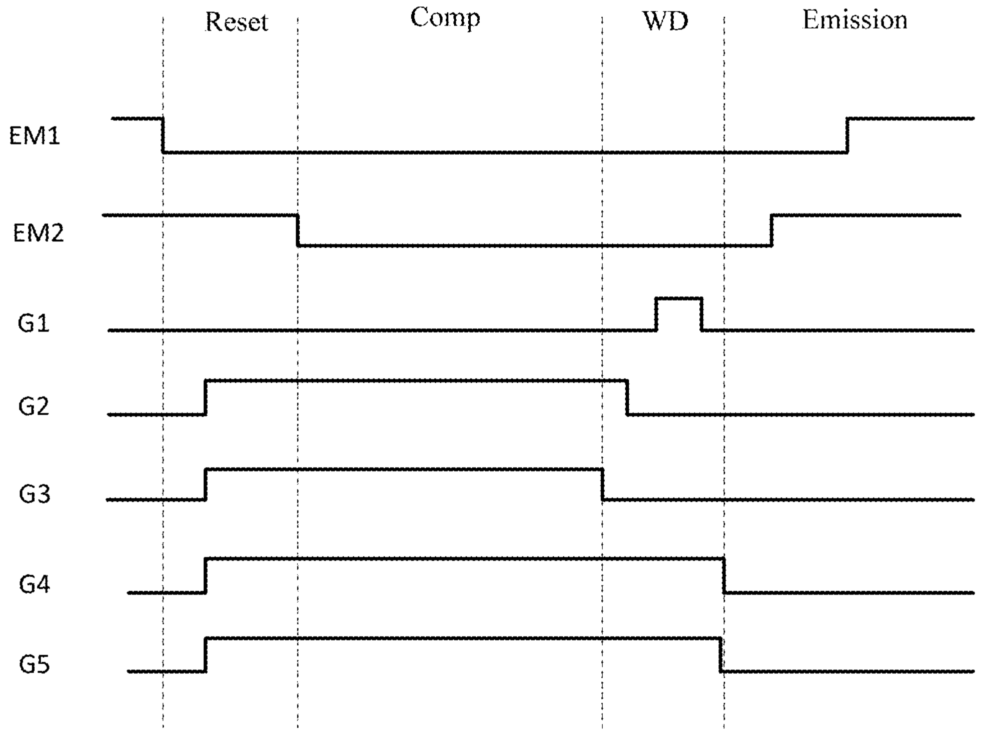
FIG. 5 schematically shows a driving timing diagram in embodiments of the present disclosure.

FIG. 5 schematically shows a driving timing diagram in embodiments of the present disclosure. The process of operating the pixel circuit DR in embodiments of the present disclosure is described as an example below in combination with FIG. 4 and FIG. 5.

In an example, one frame period is used to display one frame of picture, and one frame period may include: a reset phase Reset, a threshold compensation phase Comp, a data writing phase WD, and a light-emitting phase Emission. It should be noted that in embodiments of the present disclosure, "providing a valid/invalid signal to a certain signal line at a certain phase" and similar expressions may refer to providing a valid/invalid signal to a certain signal line at a certain time period of the phase. Whether the valid/invalid signal is provided at the same time as entering the phase, or the valid/invalid signal is provided in a time period after entering that phase, embodiments of the present disclosure do not limit it.

In the reset phase Reset, an invalid signal is provided to the first light-emitting control line EM1, a valid signal is provided to the second light-emitting control line EM2, and a valid signal is provided to the threshold compensation control line G3. Thus, the first power line ELVDD may be decoupled from the fourth node N4 by the first light-emitting control unit 120, the second node N2 may be coupled to the third node N3 by the second light-emitting control unit 130, and the fourth node N4 may be coupled to the third node N3 by the threshold compensation unit 140. At this point, the second reference signal V2 may be provided to the second node N2 (for example, the second reference signal V2 may be provided to the second node N2 by the first reset unit described below), and the reset signal Vr may be provided to the fifth node N5 (for example, the reset signal Vr may be provided to the fifth node N5 by the input unit described below). Thus, the potential of the fifth node N5 may be reset to Vr, and the potentials of the fourth node N4, the second node N2, and the third node N3 may be reset to V2.

In the threshold compensation phase Comp, an invalid signal is provided to the second light-emitting control line EM2, and a valid signal is provided to the gating control line G4. Thus, the second node N2 may be decoupled from the third node N3 by the second light-emitting control unit 130, and the first reference signal line Vini1 may be coupled to the first node N1 by the gating unit 170. At this point, the reset signal Vr may continue to be provided to the fifth node N5, while the first reference signal line Vini1 may be coupled to the second node N2 (for example, the first reference signal line Vini1 may be coupled to the second node N2 by the first reset unit described below). The voltage value of the electric signal (hereinafter, the electric signal is also referred to as the first reference signal V1) provided on the first reference signal line Vini1 at this point is less than the voltage value of the reset signal Vr. Thus, the potential of the third node N3 may be Vr-Vth, and the potential of the first node N1 may be V1. Vth is the threshold voltage of the driving transistor DT.

In the data writing phase WD, an invalid signal is provided to the threshold compensation control line G3. Thus, the fourth node N4 may be decoupled from the third node N3 by the threshold compensation unit 140. At this point, the data voltage signal Data may be provided to the fifth node N5 (for example, the data voltage signal Data may be provided to the fifth node N5 through the input unit described below), while the first reference signal line Vini1 and the second node N2 continue to be coupled. Thus, the data voltage signal Data may be written to the gate electrode of the driving transistor DT, while the first node N1 is maintained at V1, thereby preventing the jump of the fifth node N5 from interfering with the third node N3, so that the potential of the third node N3 is maintained at Vr-Vth.

In the light-emitting phase Emission, an invalid signal is provided to the gating control line G4, and a valid signal is provided to the first light-emitting control line EM1 and the second light-emitting control line EM2. Thus, the first node N1 may be decoupled from the first reference signal line Vini1 by the gating unit 170, the first power line ELVDD may be coupled to the fourth node N4 by the first light-emitting control unit 120, and the second node N2 may be coupled to the third node N3 by the second light-emitting control unit 130. At this point, the data voltage signal Data is stopped from being provided to the fifth node N5, and the first reference signal line Vini1 is decoupled from the second node N2. Thus, the driving transistor DT may provide a driving current to the light-emitting element OLED, and the driving current $I=K*(Vgs-Vth)^2$, that is, $I=K*(Data-Vr)^2$, where Vgs represents the gate-source voltage of the driving transistor. Thus, the magnitude of the driving current I is independent of the threshold voltage Vth of the driving transistor DT, thereby achieving the threshold compensation. As the first reference signal line Vini1 is decoupled from the first node N1, it is possible to avoid interference of the external DC power supply to the fifth node N5 (or the third node N3) in the light-emitting phase Emission.

Compared with the pixel circuit shown in FIG. 2, the pixel circuit DR in embodiments of the present disclosure may implement the threshold compensation and reduce the attenuation of the driving current. On this basis, in the pixel circuit DR of embodiments of the present disclosure, the first storage unit 150 and the second storage unit 160 are no longer coupled to the external DC power supply by providing the gating unit 170. Thus, the external DC power supply may be prevented from affecting the driving current in the light-emitting phase Emission, thereby improving the display effect.

The pixel circuit DR in embodiments of the present disclosure is further described below in conjunction with FIGS. 3 to 20.

In some specific embodiments, the driving unit 110 includes a driving transistor DT, which includes an oxide thin film transistor, and the oxide thin film transistor has the advantages of low leakage current. In embodiments of the present disclosure, the first electrode of the driving transistor DT serves as the first terminal of the driving unit 110, the second electrode of the driving transistor DT serves as the second terminal of the driving unit 110, and the gate electrode of the driving transistor DT serves as the third terminal of the driving unit 110.

In some specific embodiments, the pixel circuit DR further includes a first reset unit 180. The first reset unit 180 is coupled between the gating unit 170 and the first reference signal line Vini1. The first reset unit 180, the gating unit 170, and the second terminal of the driving unit 110 are coupled to each other at the second node N2. The first reset unit 180 is used to couple the first reference signal line Vini1 to the second node N2 or decouple the first reference signal line Vini1 from the second node N2.

In an example, the first terminal of the first reset unit 180 is coupled to the first reference signal line Vini1. The second terminal of the first reset unit 180 is coupled to the second node N2, and thus coupled to the second terminal of the driving unit 110 and the first terminal of the gating unit 170. The control terminal of the first reset unit 180 is coupled to the first reset control line G5. Thus, by selectively providing a valid/invalid signal to the first reset control line G5, the first reference signal line Vini1 may be coupled to the second terminal of the driving unit 110 and the first terminal of the gating unit 170 or the first reference signal line Vini1 may be decoupled from the second terminal of the driving unit 110 and the first terminal of the gating unit 170. For example, in the threshold compensation phase Comp, a valid signal is provided to the first reset control line G5, so that the first reference signal line Vini1 is coupled to the second terminal of the driving unit 110 and the first terminal of the gating unit 170 by the first reset unit 180. In the light-emitting phase Emission, an invalid signal is provided to the first reset control line G5, so that the first reference signal line Vini1 is decoupled from the second terminal of the driving unit 110 and the first terminal of the gating unit 170 by the first reset unit 180.

In an example, the first terminal of the gating unit 170 may be coupled to the second node N2, and when the first reference signal line Vini1 is coupled to the second terminal of the driving unit 110 and the first terminal of the gating unit 170, the second node N2 may be coupled to the first node N1 by the gating unit 170. At this point, the first reference signal line Vini1 may be coupled to the first node N1 to charge the first node N1, while the first reference signal line Vini1 also charges the second electrode of the driving transistor DT to control the driving transistor DT to write the threshold voltage to the third node N3. Thus, the charging of the first node N1 and the second electrode of the driving transistor DT may be achieved through one signal line, thereby saving the number of signal lines.

In some specific embodiments, the first reset unit 180 includes a first reset transistor T7, the first electrode of the first reset transistor T7 is coupled to the first reference signal line Vini1, the second electrode of the first reset transistor T7 is coupled to the second node N2, and the gate electrode of the first reset transistor T7 is coupled to the first reset control line G5. The first reference signal line Vini1 is used to provide a second reference signal V2 in the reset phase Reset, and to provide a first reference signal V1 in the threshold compensation phase Comp and the data writing phase WD.

In an example, in the reset phase Reset, a valid signal is provided to the first reset control line G5, and a second reference signal V2 is provided to the first reference signal line Vini1, so that the first reset transistor T7 is turned on, and the second reference signal V2 is transmitted to the second node N2, and the second reference signal V2 is used to reset the second node N2. In the threshold compensation phase Comp and the data writing phase WD, a valid signal is provided to the first reset control line G5, and a first reference signal V1 is provided to the first reference signal line Vini1, so that the first reset transistor T7 is turned on, and the first reference signal V1 is transmitted to the second node N2, and the first reference signal V1 is used to achieve the interference suppression and threshold compensation functions. In the light-emitting phase Emission, an invalid signal is provided to the first reset control line G5, so that the first reset transistor T7 is turned off, and the second node N2 is decoupled from the first reference signal line Vini1, and the driving transistor DT may provide a driving current to the light-emitting element OLED via the second node N2.

In embodiments of the present disclosure, the second reference signal V2 and the first reference signal V1 may be provided to the second node N2 through a transistor (i.e., the first reset transistor T7) in different time periods, which may simplify the number of transistors in the pixel circuit DR, thereby facilitating the miniaturization design of the pixel circuit DR.

In some specific embodiments, the gating unit 170 includes a gating transistor T6, a first electrode of the gating transistor T6 is coupled to the second node N2, a second electrode of the gating transistor T6 is coupled to the first node N1, and a gate electrode of the gating transistor T6 is coupled to the gating control line G4.

In an example, in the reset phase Reset, a valid signal is provided to the gating control line G4, so that the gating transistor T6 is turned on, and the second reference signal V2 may be transmitted to the first node N1. Thus, the first node N1 may be reset. In the threshold compensation phase Comp and the data writing phase WD, a valid signal is provided to the gating control line G4, so that the gating transistor T6 is turned on, and the first reference signal V1 may be transmitted to the first node N1. Thus, the mutual interference between the fifth node N5 and the third node N3 in the charging process may be suppressed. In the light-emitting phase Emission, an invalid signal is provided to the gating control line G4, so that the gating transistor T6 is turned off, and the first node N1 is decoupled from the second node N2. Thus, the external DC power supply may be prevented from interfering with the fifth node N5 (or the third node N3).

In an example, the gating control line G4 and the first reset control line G5 are arranged in one of the following manners.

The gating control line G4 and the first reset control line G5 are integrated. Thus, the gating transistor T6 and the first reset transistor T7 may share the same control line, thereby reducing the number of wirings.

The gating control line G4 and the first reset control line G5 are insulated from each other and spaced apart. Thus, the gating transistor T6 and the first reset transistor T7 may be controlled separately, thereby improving the driving flexibility.

In some specific embodiments, the pixel circuit DR further includes an input unit 190. The input unit 190 is coupled between the data line Vdata and the third terminal of the driving unit 110, and the input unit 190 is used to couple the data line Vdata to the third terminal of the driving unit 110 or decouple the data line Vdata from the third terminal of the driving unit 110. The input unit 190 is further coupled between the reset signal line Vref and the third terminal of the driving unit 110, and the input unit 190 is used to couple the reset signal line Vref to the third terminal of the driving unit 110 or decouple the reset signal line Vref from the third terminal of the driving unit 110.

In an example, the first terminal of the input unit 190 is coupled to the data line Vdata, the second terminal of the input unit 190 is coupled to the third terminal of the driving unit 110 at the fifth node N5, and the control terminal of the input unit 190 is coupled to the input control line G1 and the third reset control line G2. Thus, by selectively providing a valid/invalid signal to the input control line G1, the data line Vdata may be coupled to the fifth node N5 or the data line Vdata may be decoupled from the fifth node N5, and then the data line Vdata may be coupled to the third terminal of the driving unit 110 or the data line Vdata may be decoupled from the third terminal of the driving unit 110. For example, in the reset phase Reset, the threshold compensation phase Comp, and the light-emitting phase Emission, an invalid signal is provided to the input control line G1, so that the data line Vdata may be decoupled from the third terminal of the driving unit 110 by the first reset unit 180. In the data writing phase WD, a valid signal is provided to the input control line G1, so that the data line Vdata may be coupled to the third terminal of the driving unit 110 by the first reset unit 180.

In an example, the input unit 190 further includes a third terminal, the third terminal is coupled to the reset signal line Vref, and the third terminal may be coupled to the second terminal of the input unit 190 or the third terminal may be decoupled from the second terminal of the input unit 190 by the control terminal of the input unit 190. Thus, by selectively providing a valid/invalid signal to the third reset control line G2, the reset signal line Vref may be coupled to the fifth node N5 or the reset signal line Vref may be decoupled from the fifth node N5, and then the reset signal line Vref may be coupled to the third terminal of the driving unit 110 or the reset signal line Vref may be decoupled from the third terminal of the driving unit 110. For example, in the reset phase Reset, a valid signal is provided to the third reset control line G2, so that the reset signal line Vref is coupled to the third terminal of the driving unit 110 by the first reset unit 180. In the data writing phase WD, an invalid signal is provided to the input control line G1 so that the reset signal line Vref is coupled to the third terminal of the driving unit 110 by the first reset unit 180. In an example, when the reset signal line Vref is coupled to the fifth node N5, the fifth node N5 may be reset, and when the data line Vdata is coupled to the fifth node N5, the data voltage signal Data may be written to the fifth node N5.

In some specific embodiments, the input unit 190 includes: an input transistor T1 and a third reset transistor T2. A first electrode of the input transistor T1 is coupled to the third terminal of the driving unit 110, a second electrode of the input transistor T1 is coupled to the data line Vdata, and a gate electrode of the input transistor T1 is coupled to the input control line G1. A first electrode of the third reset transistor T2 is coupled to the third terminal of the driving unit 110, a second electrode of the third reset transistor T2 is coupled to the reset signal line Vref, and a gate electrode of the third reset transistor T2 is coupled to the third reset control line G2.

In an example, in the reset phase Reset and the threshold compensation phase Comp, a valid signal is provided to the third reset control line G2, and an invalid signal is provided to the input control line G1, so that the input transistor T1 is turned off, the third reset transistor T2 is turned on, and the reset signal line Vref is coupled to the fifth node N5, thereby resetting the fifth node N5. In the data writing phase WD, an invalid signal is provided to the third reset control line G2, and a valid signal is provided to the input control line G1, so that the input transistor T1 is turned on, the third reset transistor T2 is turned off, and the data line Vdata is coupled to the fifth node N5, thereby writing the data voltage signal Data to the fifth node N5. Therefore, in embodiments of the present disclosure, the fifth node N5 may be coupled to/decoupled from the data line Vdata or the reset signal line Vref by controlling two separate transistors, and the controllings of the two transistors do not affect each other, thereby improving driving flexibility.

In some specific embodiments, the threshold compensation unit 140 includes: a threshold compensation transistor T4. A first electrode of the threshold compensation transistor T4 is coupled to the first electrode of the light-emitting element OLED, a second electrode of the threshold compensation transistor T4 is coupled to the first terminal of the driving unit 110, and a gate electrode of the threshold compensation transistor T4 is coupled to the threshold compensation control line G3.

In an example, in the reset phase Reset and the threshold compensation phase Comp, a valid signal is provided to the threshold compensation control line G3, so that the threshold compensation transistor T4 is turned on, and the fourth node N4 is coupled to the third node N3. At this point, when a suitable voltage is applied to the first electrode of the driving transistor DT and the gate electrode of the driving transistor DT, the threshold voltage Vth of the driving transistor DT may be written into the third node N3. In the data writing phase WD and the light-emitting phase Emission, an invalid signal is provided to the threshold compensation control line G3, so that the threshold compensation transistor T4 is turned off, and the fourth node N4 is decoupled from the third node N3.

In an example, the third reset control line G2 and the threshold compensation control line G3 are arranged in one of the following manners.

The third reset control line G2 and the threshold compensation control line G3 are integrated. Thus, the third reset transistor T2 and the threshold compensation transistor T4 may share the same control line, thereby reducing the number of wirings.

The third reset control line G2 and the threshold compensation control line G3 are insulated from each other and spaced apart. Thus, the third reset transistor T2 and the threshold compensation transistor T4 may be separately controlled, thereby improving the driving flexibility.

In some specific embodiments, the first light-emitting control unit 120 includes a first light-emitting control transistor T3, a first electrode of the first light-emitting control transistor T3 is coupled to the first power line ELVDD, a second electrode of the first light-emitting control transistor T3 is coupled to the first terminal of the driving unit 110, and a gate electrode of the first light-emitting control transistor T3 is coupled to the first light-emitting control line EM1. The second light-emitting control unit 130 includes a second light-emitting control transistor T5, a first electrode of the second light-emitting control transistor T5 is coupled to the second terminal of the driving unit 110, a second electrode of the second light-emitting control transistor T5 is coupled to the first electrode of the light-emitting element OLED, and a gate electrode of the second light-emitting control transistor T5 is coupled to the second light-emitting control line EM2.

In an example, in the reset phase Reset, an invalid signal is provided to the first light-emitting control line EM1, and a valid signal is provided to the second light-emitting control line EM2, so that the first light-emitting control transistor T3 is turned off, and the second light-emitting control transistor T5 is turned on. As described above, in this phase, the first reference signal line Vini1 is coupled to the second node N2, and the second reference signal V2 is provided to the second node N2. Thus, the third node N3 may be reset. In the threshold compensation phase Comp and the data writing phase WD, an invalid signal is provided to each of the first light-emitting control line EM1 and the second light-emitting control line EM2, so that the first light-emitting control transistor T3 and the second light-emitting control transistor T5 are both turned off. As described above, in this phase, the fourth node N4 is coupled to the third node N3. Thus, the threshold voltage of the driving transistor DT may be written to the third node N3. In the light-emitting phase Emission, a valid signal is provided to each of the first light-emitting control line EM1 and the second light-emitting control line EM2, so that the first light-emitting control transistor T3 and the second light-emitting control transistor T5 are both turned on, the fourth node N4 is coupled to the first power line ELVDD, and the driving transistor DT provides a driving current to the light-emitting element OLED based on the gate voltage of the driving transistor DT. As the threshold voltage Vth has been written to the third node N3, the magnitude of the driving current is independent of the threshold voltage Vth, thereby achieving threshold compensation. For details, please refer to the above embodiments, which will not be repeated here.

The first storage unit 150 includes a first capacitor C1. A first electrode plate of the first capacitor C1 is coupled to the third terminal of the driving unit 110, and a second electrode plate of the first capacitor C1 is coupled to the first node N1. The second storage unit 160 includes a second capacitor C2. A first electrode plate of the second capacitor C2 is coupled to the first node N1, and a second electrode plate of the second capacitor C2, the second light-emitting control unit 130, the threshold compensation unit 140 and the first electrode of the light-emitting element OLED are coupled at the third node N3.

Through the first capacitor C1 and the second capacitor C2, the driving current output by the driving transistor DT may be proportional to [(C3'+C2')/(C1'+C2'+C3')], thereby reducing the attenuation of the driving current. In the threshold compensation phase Comp and the data writing phase WD, as the first node N1 is coupled to receive the first reference signal V1, the mutual interference between the fifth node N5 and the third node N3 in the charging process may be suppressed, so that both the fifth node N5 and the third node N3 are maintained at desired potentials.

In some specific embodiments, the pixel circuit DR includes the input transistor T1, the third reset transistor T2, the first light-emitting control transistor T3, the threshold compensation transistor T4, the second light-emitting control transistor T5, the gating transistor T6, the first reset transistor T7, the first capacitor C1 and the second capacitor C2.

Referring to FIG. 5, in the reset phase Reset, an invalid signal is provided to the first light-emitting control line EM1 and the input control line G1, a valid signal is provided to the second light-emitting control line EM2, a valid signal is provided to the third reset control line G2, the threshold compensation control line G3, the gating control line G4 and the first reset control line G5, and a second reference signal V2 is provided to the first reference signal line Vini1, so that the input transistor T1 and the first light-emitting control transistor T3 are turned off, and the third reset transistor T2, the threshold compensation transistor T4, the second light-emitting control transistor T5, the gating transistor T6 and the first reset transistor T7 are turned on. Thus, the potential of the fifth node N5 may be reset to Vr, and the potentials of the fourth node N4, the second node N2, the third node N3 and the first node N1 may be reset to V2.

In the threshold compensation phase Comp, an invalid signal is provided to the second light-emitting control line EM2, and a first reference signal V1 is provided to the first reference signal line Vini1, so that the second light-emitting control transistor T5 is turned off. Therefore, the fifth node N5 may be maintained at Vr, the second node N2 and the first node N1 are charged to be at V1, and the fourth node N4 and the third node N3 are at Vr-Vth.

In the data writing phase WD, an invalid signal is provided to the third reset control line G2 and the threshold compensation control line G3, and a valid signal is provided to the input control line G1, so that the third reset transistor T2 and the threshold compensation transistor T4 are turned off, and the input transistor T1 is turned on. Therefore, the data voltage signal Data may be written to the fifth node N5, the first node N1 is still at V1, and the third node N3 may be maintained at Vr-Vth.

In the light-emitting phase Emission, an invalid signal is provided to the input control line G1, the gating control line G4 and the first reset control line G5, and a valid signal is provided to the first light-emitting control line EM1 and the second light-emitting control line EM2, so that the input transistor T1, the gating transistor T6 and the first reset transistor T7 are turned off, and the first light-emitting control transistor T3 and the second light-emitting control transistor T5 are turned on. Therefore, the driving transistor DT may provide a driving current to the light-emitting element OLED, and the driving current $I=K*(Vgs-Vth)^2$, that is, $I=K*(Data-Vr)^2$. The magnitude of the driving current I is independent of the threshold voltage of the driving transistor DT, thereby achieving threshold compensation. Moreover, as the first reference signal line Vini1 is decoupled from the first node N1, the external DC power supply is prevented from interfering with the fifth node N5 (or the third node N3) in the light-emitting phase Emission.

The planar structure of the pixel circuit DR in embodiments of the present disclosure is described below in conjunction with FIGS. 7 to 14.

Referring to FIGS. 7 to 14, in some specific embodiments, the pixel circuit DR further includes a first substrate (not shown in the figure), the driving unit 110 includes: a driving transistor DT, the first light-emitting unit includes a first light-emitting control transistor T3, the second light-emitting control unit 130 includes a second light-emitting control transistor T5, the threshold compensation unit 140 includes a threshold compensation transistor T4, the gating unit 170 includes a gating transistor T6, and the first storage unit 150 includes a first capacitor C1. An orthographic projection of the first light-emitting control transistor T3 on the first substrate and an orthographic projection of the threshold compensation transistor T4 on the first substrate are arranged in the first direction X, and orthographic projections of the driving transistor DT, the first capacitor C1, the second light-emitting control transistor T5 and the gating transistor T6 on the first substrate are located between the orthographic projection of the first light-emitting control transistor T3 on the first substrate and the orthographic projection of the threshold compensation transistor T4 on the first substrate.

Figure 14:
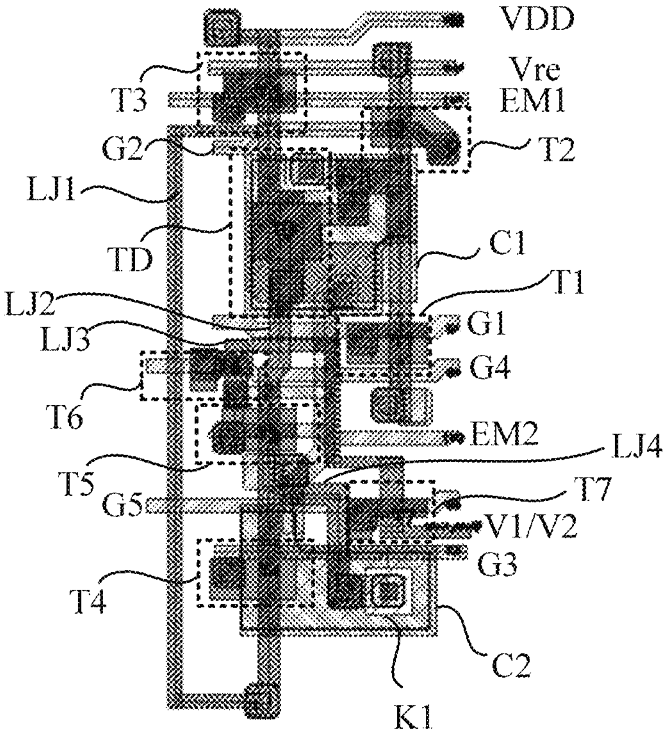

In an example, the first direction X may refer to the vertical direction in FIG. 14. For example, in the same pixel circuit DR, the first light-emitting control transistor T3 and the threshold compensation transistor T4 are respectively located on the upper and lower sides of other transistors. Thus, it is beneficial to couple the first light-emitting control transistor T3 to the threshold compensation transistor T4 without affecting other transistors.

In an example, the pixel circuit DR includes a first metal layer LS, a first gate layer Gate1, a semiconductor layer ACT, a second gate layer Gate2 and a first source and drain metal layer SD1 arranged sequentially in a direction away from the first substrate. It should be noted that an insulating layer is provided between any two of the first metal layer LS, the first gate layer Gate1, the semiconductor layer ACT, the second gate layer Gate2 and the first source and drain metal layer SD1, for example, the first insulating layer JY1 and the second insulating layer JY2 respectively shown in FIG. 11 and FIG. 12. The insulating layer may be a single film layer or a composite film layer, and embodiments of the present disclosure are not limited thereto. The material of the semiconductor layer ACT may include indium gallium zinc oxide (IGZO).

In an example, each transistor in embodiments of the present disclosure may include an active portion located in the semiconductor layer ACT, the active portion including a first electrode connecting portion, a second electrode connecting portion, and a channel portion located between the first electrode connecting portion and the second electrode connecting portion. Each transistor further includes a gate electrode located in the second gate layer, for example, the input transistor T1 includes a gate electrode T1_GC, the third reset transistor T2 includes a gate electrode T2_GC, the first light-emitting control transistor T3 includes a gate electrode T3_GC, the threshold compensation transistor T4 includes a gate electrode T4_GC, the second light-emitting control transistor T5 includes a gate electrode T5_GC, the gating transistor T6 includes a gate electrode T6_GC, and the first reset transistor T7 includes a gate electrode T7_GC. The orthographic projection of the gate electrode of the transistor on the first substrate covers the orthographic projection of the channel portion on the first substrate. Each transistor further includes a first electrode and a second electrode. For example, the input transistor T1 includes a first electrode T1_S1 and a second electrode T1_S2, the third reset transistor T2 includes a first electrode T2_S1 and a second electrode T2_S2, the first light-emitting control transistor T3 includes a first electrode T3_S1 and a second electrode T3_S2, the threshold compensation transistor T4 includes a first electrode T4_S1 and a second electrode T4_S2, the second light-emitting control transistor T5 includes a first electrode T5_S1 and a second electrode T5_S2, the gating transistor T6 includes a first electrode T6_S1 and a second electrode T6_S2, and the first reset transistor T7 includes a first electrode T7_S1 and a second electrode T7_S2.

For example, in the same transistor, the first electrode connecting portion is used to couple to the first electrode of the transistor, and the second electrode connecting portion is used to couple to the second electrode of the transistor.

For example, the first electrode and the second electrode of the transistor may be located in the first source and drain metal layer SD1. Alternatively, several conductive regions may be formed by doping metal conductive materials in the semiconductor layer ACT, and part or entire of the first electrode and the second electrode of the transistor may be located in these conductive regions. In embodiments of the present disclosure, the film layer where the first electrode and the second electrode of the transistor are located may be specifically determined according to actual desires, and embodiments of the present disclosure are not limited to this. For clarity, the first electrode and the second electrode of the transistor hereinafter may refer to the parts of the first electrode and the second electrode located in the conductive regions of the semiconductor layer ACT.

In an example, the first power line ELVDD is located in the first source and drain metal layer SD1 and extends in the second direction Y, and the second direction Y intersects with the first direction X. For example, the second direction Y may be the horizontal direction in FIG. 14. The orthographic projection of the first light-emitting control transistor T3 on the first substrate is located between the orthographic projection of the first power line ELVDD on the first substrate and the orthographic projection of the driving transistor DT on the first substrate. The first electrode T3_S1 of the first light-emitting control transistor T3 is coupled to the first power line ELVDD through a first via hole H1, and the first via hole H1 penetrates the insulating layer between the first source and drain metal layer SD1 and the semiconductor layer ACT, and the orthographic projection of the first via hole H1 on the first substrate overlaps with the orthographic projection of the first power line ELVDD on the first substrate.

In an example, the first light-emitting control line EM1 is located in the first source and drain metal layer SD1 and extends in the second direction Y. The orthographic projection of the first light-emitting control line EM1 on the first substrate overlaps with the orthographic projection of the first light-emitting control transistor T3 on the first substrate. The gate electrode T3_GC of the first light-emitting control transistor T3 is coupled to the first light-emitting control line EM1 through a second via hole H2, the second via hole H2 penetrates the insulating layer between the first source and drain metal layer SD1 and the second gate layer Gate2, and the orthographic projection of the second via hole H2 on the first substrate overlaps with the orthographic projection of the first light-emitting control line EM1 on the first substrate.

In an example, the threshold compensation control line G3 is located in the first source and drain metal layer SD1 and extends in the second direction Y. The orthographic projection of the threshold compensation control line G3 on the first substrate overlaps with the orthographic projection of the threshold compensation transistor T4 on the first substrate. The gate electrode T4_GC of the threshold compensation transistor T4 is coupled to the threshold compensation control line G3 through the third via hole H3, and the third via hole H3 penetrates the insulating layer between the second gate layer Gate2 and the first source and drain metal layer SD1. In an example, a first transfer portion ZJ1 is provided on the threshold compensation control line G3. For example, the orthographic projection of the first transfer portion ZJ1 on the first substrate is located on a side of the orthographic projection of the threshold compensation control line G3 on the first substrate away from the orthographic projection of the driving transistor DT on the first substrate. The gate electrode T4_GC of the threshold compensation transistor T4 is coupled to the first transfer portion ZJ1 through the third via hole H3, and the orthographic projection of the third via hole H3 on the first substrate overlaps with the orthographic projection of the first transfer portion ZJ1 on the first substrate.

In some specific embodiments, the second electrode T3_S2 of the first light-emitting control transistor T3 is coupled to the second electrode T4_S2 of the threshold compensation transistor T4 through the first connecting portion LJ1, and the orthographic projections of the first light-emitting control transistor T3, the driving transistor DT, the first capacitor C1, the second light-emitting control transistor T5, the gating transistor T6 and the threshold compensation transistor T4 on the first substrate are located on the same side of the orthographic projection of the first connecting portion LJ1 on the first substrate.

In an example, the first connecting portion LJ1 extends in the first direction X, and the first connecting portion LJ1 is located in the semiconductor layer ACT. The first light-emitting control transistor T3, the driving transistor DT, the first capacitor C1, the second light-emitting control transistor T5, the gating transistor T6 and the threshold compensation transistor T4 are all located on the right side of the first connecting portion LJ1. Thus, the first connecting portion LJ1 may bypass the connecting structures between the above transistors.

In an example, the orthographic projection of the second electrode T4_S2 of the threshold compensation transistor T4 on the first substrate is located on a side of the orthographic projection of the first electrode T4_S1 of the threshold compensation transistor T4 on the first substrate away from the orthographic projection of the driving transistor DT on the first substrate, so that the connection position of the first connecting portion LJ1 and the threshold compensation transistor T4 may be set on the side away from the above transistors, thereby reducing the impact of the newly added wires on the current circuit.

In some specific embodiments, the orthographic projection of the driving transistor DT on the first substrate overlaps with the orthographic projection of the first capacitor C1 on the first substrate. Thus, the area occupied by the driving transistor DT and the first capacitor C1 may be reduced.

In an example, the first electrode plate C1_1 of the first capacitor C1 is located in the light shielding layer, the second electrode plate C1_2 of the first capacitor C1 is located in the first gate layer Gate1, and the gate electrode DT_GC of the driving transistor DT is located in the second gate layer Gate2. The orthographic projection of the first electrode plate C1_1 of the first capacitor C1 overlaps with the orthographic projection of the second electrode plate C1_2 on the first substrate, and a first notch QK1 is provided on the second electrode plate C1_2, and the first notch QK1 exposes the second electrode plate C1_2.

In an example, the gate electrode DT_GC of the driving transistor DT may be coupled to the second transfer portion ZJ2, and then the second transfer portion ZJ2 is coupled to the first electrode plate C1_1 of the first capacitor C1 through the first notch QK1.

In an example, the second transfer portion ZJ2 is located in the first source and drain metal layer SD1, and the second transfer portion ZJ2 includes a first portion extending in the first direction X and a second portion extending in the second direction Y. The gate electrode DT_GC of the driving transistor DT is coupled to the first portion, and the second portion is coupled to the first electrode plate C1_1 of the first capacitor C1 through the first notch QK1.

In an example, the second electrode DT_S2 of the driving transistor DT is coupled to the second electrode plate C1_2 of the first capacitor C1 through the second transfer portion ZJ2, the second transfer portion ZJ2 is located in the first source and drain metal layer SD1, and the orthographic projection of the second transfer portion ZJ2 on the first substrate overlaps with the orthographic projection of the driving transistor DT on the first substrate and the orthographic projection of the first capacitor C1 on the first substrate.

In some specific embodiments, the second storage unit 160 includes a second capacitor C2, the orthographic projection of the first capacitor C1 on the first substrate and the orthographic projection of the second capacitor C2 on the first substrate are arranged in the first direction X, and the orthographic projection of the second light-emitting control transistor T5 and the orthographic projection of the gating transistor T6 on the first substrate are located between the orthographic projection of the first capacitor C1 on the first substrate and the orthographic projection of the second capacitor C2 on the first substrate. In this way, as the second light-emitting control transistor T5 and the gating transistor T6 are arranged between the first capacitor C1 and the second capacitor C2, the space utilization is improved.

In an example, the orthographic projection of the second light-emitting control transistor T5 on the first substrate is located between orthographic projections of the gating transistors T6 on the first substrate, and the second light-emitting control line EM2 and the gating control line G4 are both located in the first source and drain metal layer SD1 and extend in the second direction Y. The gating control line G4 is coupled to the gate electrode T6_GC of the gating transistor T6 through a fourth via hole H4, the fourth via hole H4 penetrates the insulating layer between the second gate layer Gate2 and the first source and drain metal layer SD1, and the orthographic projection of the fourth via hole H4 on the first substrate overlaps with the orthographic projection of the gating control line G4 on the first substrate. The second light-emitting control line EM2 is coupled to the gate electrode T5_GC of the second light-emitting control transistor T5 through a fifth via hole H5, the fifth via hole H5 penetrates the insulating layer between the second gate layer Gate2 and the first source and drain metal layer SD1, and the orthographic projection of the fifth via hole H5 on the first substrate overlaps with the orthographic projection of the second light-emitting control line EM2 on the first substrate.

In some specific embodiments, the orthographic projection of the threshold compensation transistor T4 on the first substrate overlaps with the orthographic projection of the second capacitor C2 on the first substrate. Thus, the area occupied by the threshold compensation transistor T4 and the second capacitor C2 may be reduced.

In an example, the orthographic projection of the third via hole H3 on the first substrate does not overlap with the orthographic projection of the second capacitor C2 on the first substrate, so that the connection position of the gate electrode T4_GC of the threshold compensation transistor T4 and the threshold compensation control line G3 bypasses the second capacitor C2.

In some specific embodiments, the orthographic projection of the gating transistor T6 on the first substrate is located between the orthographic projection of the second light-emitting control transistor T5 on the first substrate and the orthographic projection of the driving transistor DT on the first substrate. The second electrode DT_S2 of the driving transistor DT, the first electrode T5_S1 of the second light-emitting control transistor T5 and the second electrode DT_S2 of the driving transistor DT are coupled through the second connecting portion LJ2, the orthographic projection of the gating transistor T6 on the first substrate is located between the orthographic projection of the second connecting portion LJ2 and the orthographic projection of the first connecting portion LJ1 on the first substrate, and the first electrode T6_S1 of the gating transistor T6 is coupled to the second connecting portion LJ2 through the third connecting portion LJ3.

Figure 9:
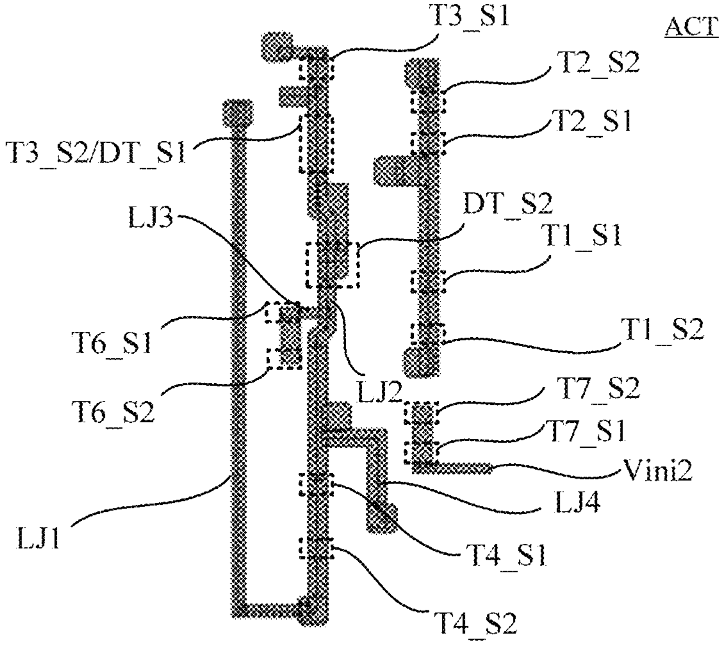
Figure 10:
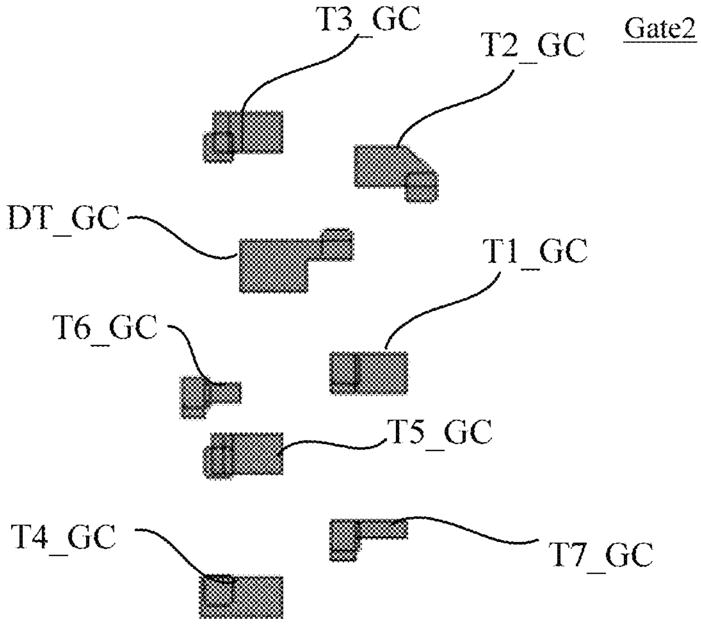
Figure 11:
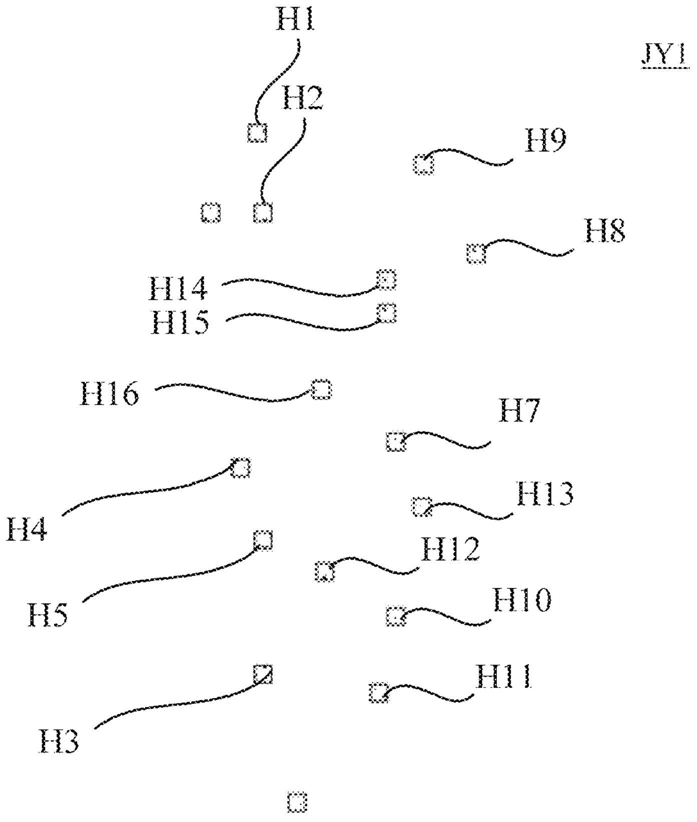
Figure 12:
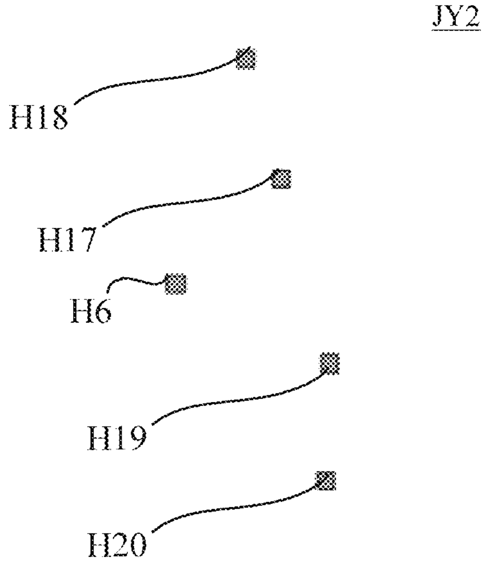
Figure 13:
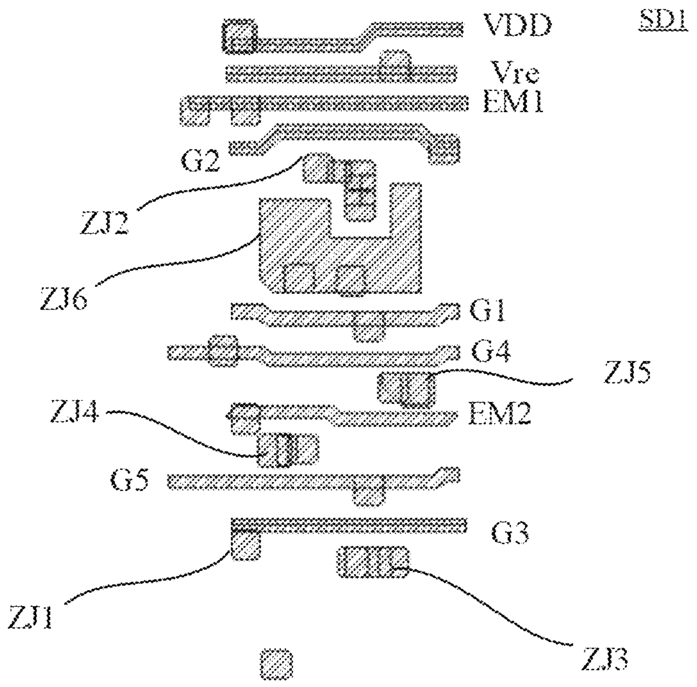

In an example, the second connecting portion LJ2 is located in the conductive region in the semiconductor layer ACT. The second connecting portion LJ2 extends in the first direction X. Referring to FIG. 9, the first electrode T6_S1 of the gating transistor T6 extends toward the right side and thus couples to the second connecting portion LJ2. In this way, the gating transistor T6 and the second light-emitting control transistor T5 may be preferably arranged between the driving transistor DT and the second capacitor C2, thereby improving space utilization.

In an example, the second electrode plate C1_2 of the first capacitor C1 is coupled to the first electrode plate C2_1 of the second capacitor C2 through the first connecting structure ZJG1, the first connecting structure ZJG1 extends in the first direction X, and the orthographic projection of the first connecting structure ZJG1 on the first substrate is located on a side of the orthographic projection of the second connecting portion LJ2 on the first substrate away from the orthographic projection of the first connecting portion LJ1 on the first substrate. The first connecting structure ZJG1 is located in the first gate layer Gate1. The second electrode T6_S2 of the gating transistor T6 is coupled to a second connecting structure ZJG2 through the sixth via hole H6, and then coupled to the first connecting structure ZJG1 through the second connecting structure ZJG2. The sixth via hole H6 penetrates the insulating layer between the first gate layer Gate1 and the semiconductor layer ACT. The second connecting structure ZJG2 extends in the second direction Y, and the second connecting structure ZJG2 is located in the first gate layer Gate1. The orthographic projection of the sixth via hole H6 on the first substrate overlaps with the orthographic projection of the second connecting structure ZJG2 on the first substrate.

In some specific embodiments, the pixel circuit DR further includes an input unit 190, and the input unit 190 includes an input transistor T1, the orthographic projection of the input transistor T1 on the first substrate is located on a side of the orthographic projection of the first capacitor C1 on the first substrate away from the orthographic projection of the first light-emitting control transistor T3 on the first substrate, and the orthographic projection of the gating transistor T6 on the first substrate is located between the orthographic projection of the input transistor T1 on the first substrate and the orthographic projection of the first connecting portion LJ1 on the first substrate. Thus, the input transistor T1, the second light-emitting control transistor T5 and the gating transistor T6 may be preferably arranged between the first capacitor C1 and the second capacitor C2.

In an example, the input transistor T1 and the gating transistor T6 are arranged in the second direction Y, the input control line G1 is located in the first source and drain metal layer SD1, the orthographic projection of the input control line G1 on the first substrate is located between the orthographic projection of the first capacitor C1 on the first substrate and the orthographic projection of the gating control line G4 on the first substrate, the input control line G1 extends in the second direction Y, and the orthographic projection of the input control line G1 on the first substrate overlaps with the orthographic projection of the input transistor T1 on the first substrate.

In an example, the gate electrode T1_GC of the input transistor T1 is coupled to the input control line G1 through the seventh via hole H7, and the seventh via hole H7 penetrates the insulating layer between the second gate layer Gate2 and the first source and drain metal layer SD1. The orthographic projection of the seventh via hole H7 on the first substrate overlaps with the orthographic projection of the input control line G1 on the first substrate.

In some specific embodiments, the input unit 190 further includes a third reset transistor T2, the orthographic projection of the third reset transistor T2 on the first substrate is located on a side of the orthographic projection of the first capacitor C1 on the first substrate facing the orthographic projection of the first light-emitting control transistor T3 on the first substrate, and the orthographic projection of the first light-emitting control transistor T3 on the first substrate is located between the orthographic projection of the third reset transistor T2 on the first substrate and the orthographic projection of the first connecting portion LJ1 on the first substrate.

In an example, the third reset transistor T2 and the first light-emitting control transistor T3 are arranged in the second direction Y. The third reset control line G2 and the reset signal line Vref are both located in the first source and drain metal layer SD1, and the third reset control line G2 and the reset signal line Vref extend in the second direction Y. The orthographic projection of the third reset control line G2 on the first substrate is located between the orthographic projection of the first light-emitting control line EM1 on the first substrate and the orthographic projection of the first capacitor C1 on the first substrate. The orthographic projection of the reset signal line Vref on the first substrate is located between the orthographic projection of the first power line ELVDD on the first substrate and the orthographic projection of the first light-emitting control line EM1 on the first substrate. The gate electrode T2_GC of the third reset transistor T2 is coupled to the third reset control line G2 through the eighth via hole H8, and the second electrode T2_S2 of the third reset transistor T2 is coupled to the reset signal line Vref through the ninth via hole H9. The eighth via hole H8 penetrates the insulating layer between the second gate layer Gate2 and the first source and drain metal layer SD1, and the ninth via hole H9 penetrates the insulating layer between the semiconductor layer ACT and the first source and drain metal layer SD1. The orthographic projection of the eighth via hole H8 on the first substrate overlaps with the orthographic projection of the third reset control line G2 on the first substrate, and the orthographic projection of the ninth via hole H9 on the first substrate overlaps with the orthographic projection of the reset signal line Vref on the first substrate. In an example, the orthographic projection of the eighth via hole H8 on the first substrate is located on a side of the orthographic projection of the first capacitor C1 on the first substrate away from the orthographic projection of the first connecting portion LJ1 on the first substrate. Thus, the third reset transistor T2 and the first light-emitting control transistor T3 may be preferably arranged between the first power line ELVDD and the first capacitor C1.

In an example, the first electrode T2_S1 of the third reset transistor T2 is coupled to the second transfer portion ZJ2 described above, and then coupled to the gate electrode DT_GC of the driving transistor DT through the second transfer portion ZJ2.

In some specific embodiments, the second capacitor C2 includes a first electrode plate C2_1 and a second electrode plate C2_2, the second electrode plate C2_2 is located on a side of the first electrode plate C2_1 facing the first substrate, and a first opening K1 is provided on the first electrode plate C2_1 of the second capacitor C2, and the first opening K1 exposes the second electrode plate C2_2 of the second capacitor C2. The orthographic projection of the first opening K1 on the first substrate and the orthographic projection of the threshold compensation transistor T4 on the first substrate are arranged in the second direction Y, and the second direction Y intersects with the first direction X. The first electrode T4_S1 of the threshold compensation transistor T4 is coupled to the second electrode T5_S2 of the second light-emitting control transistor T5, and then coupled to the fourth connecting portion LJ4. The second connecting portion LJ2 is located on a side of the first electrode plate C2_1 of the second capacitor C2 away from the first substrate. A part of the fourth connecting portion LJ4 passes through the first opening K1 and is coupled to the second electrode plate C2_2 of the second capacitor C2.

In an example, the fourth connecting portion LJ4 is located in the conductive region of the semiconductor layer ACT, and the orthogonal projection of the fourth connecting portion LJ4 on the first substrate is located on a side of the orthogonal projection of the second light-emitting control line EM2 on the first substrate away from the orthogonal projection of the driving transistor DT on the first substrate. Referring to FIG. 9, the fourth connecting portion LJ4 extends downward to the left side of the first opening K1, and then extends to the right side into the first opening K1, thereby coupling to the second electrode plate C2_2 of the second capacitor C2 through the first opening K1.

In some specific embodiments, the pixel circuit DR further includes a first reset unit 180, and the first reset unit 180 includes a first reset transistor T7, the orthogonal projection of the first reset transistor T7 on the first substrate is located on a side of the orthogonal projection of the second capacitor C2 on the first substrate facing the orthogonal projection of the first light-emitting control transistor T3 on the first substrate, and the orthogonal projection of the first reset transistor T7 on the first substrate and the orthogonal projection of the first opening K1 on the first substrate are arranged in the first direction X.

In an example, the orthographic projection of the first reset transistor T7 on the first substrate is located between the orthographic projection of the second light emitting control line EM2 on the first substrate and the orthographic projection of the first opening K1 on the first substrate. In an example, the first reset control line G5 is located in the first source and drain metal layer SD1, the gate electrode T7_GC of the first reset transistor T7 is located in the second gate layer Gate2, the gate electrode T7_GC of the first reset transistor T7 is coupled to the first reset control line G5 through the tenth via hole H10, the tenth via hole H10 penetrates the insulating layer between the first source and drain metal layer SD1 and the second gate layer Gate2, and the orthographic projection of the tenth via hole H10 on the first substrate overlaps with the orthographic projection of the first reset control line G5 on the first substrate. In an example, a part of the first reference signal line Vini1 is located in the conductive region of the semiconductor layer ACT, and the first reference signal line Vini1 and the first electrode of the first reset transistor T7 are integrated.

In an example, the fourth connecting portion LJ4 may be coupled to the third transfer portion ZJ3 through the eleventh via hole H11, the third transfer portion ZJ3 is located in the first source and drain electrode layer SD1, and the third transfer portion ZJ3 may be coupled to the second electrode plate C2_2 of the second capacitor C2 through the twentieth via hole H20 and the first opening K1.

In an example, the fourth connecting portion LJ4 may be coupled to the fourth transfer portion ZJ4 through the twelfth via hole H12, the fourth transfer portion ZJ4 is located in the first source and drain electrode layer SD1, and then coupled to the first electrode of the light-emitting element OLED through the fourth transfer portion ZJ4.

In an example, the second electrode T1_S2 of the input transistor T1 may be coupled to the fifth transfer portion ZJ5 through the thirteenth via hole H13, the fifth transfer portion ZJ5 is located in the first source and drain electrode layer SD1, and then coupled to the data line Vdata through the fifth transfer portion ZJ5.

In an example, the first electrode T2_S1 of the third reset transistor T2 may be coupled to the second transfer portion ZJ2 through the fourteenth via hole H14, and the second transfer portion ZJ2 may be coupled to the gate electrode DT_GC of the driving transistor DT through the fifteenth via hole H15. The second transfer portion ZJ2 may be coupled to the first electrode plate C1_1 of the first capacitor C1 through the eighteenth via hole H18 and the first notch QK1.

In an example, the second electrode DT_S2 of the driving transistor DT may be coupled to the sixth transfer portion ZJ6 through the sixteenth via hole H16, and the sixth transfer portion ZJ6 is located in the first source and drain electrode layer SD1, and the sixth transfer portion ZJ6 may be coupled to the second electrode plate C1_2 of the first capacitor C1 through the seventeenth via hole H17.

In an example, the second electrode T7_S2 of the first reset transistor T7 may be coupled to the second electrode DT_S2 of the driving transistor DT through the nineteenth via hole H19.

Figure 6:
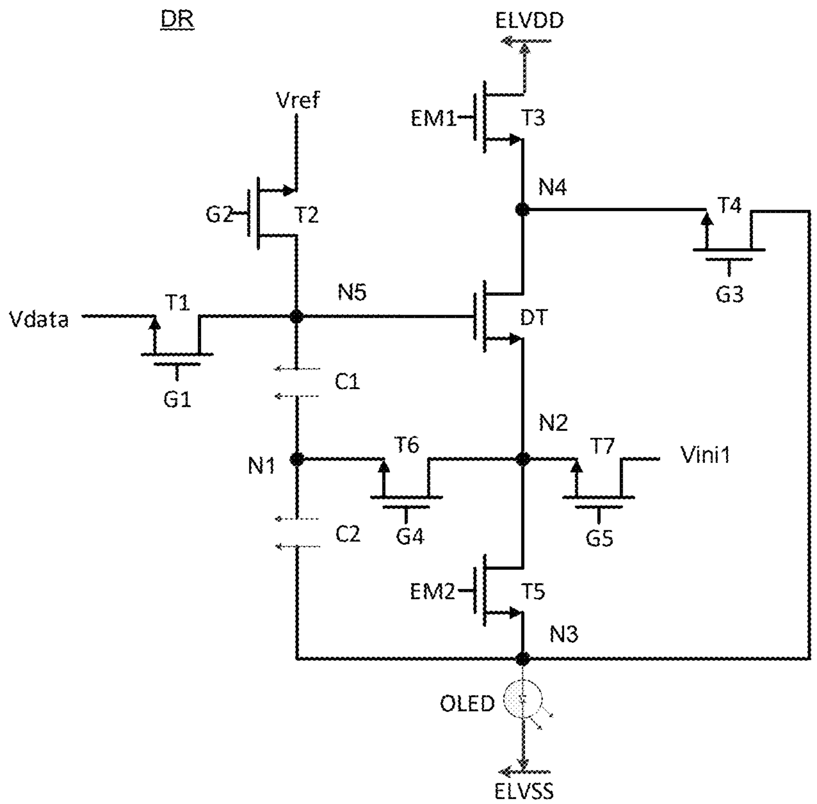
FIG. 6 schematically shows a schematic diagram of a pixel circuit in some exemplary embodiments of the present disclosure.
Figure 7:
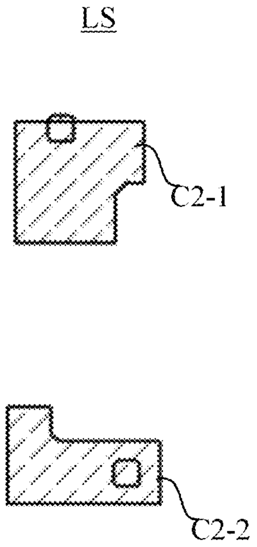
FIG. 7 to FIG. 14 schematically show a planar structure of a pixel circuit according to embodiments of the present disclosure, where FIG. 7 to FIG. 14 schematically illustrate different film layers or combinations of different film layers of a planar structure of a pixel circuit, respectively.
Figure 8:
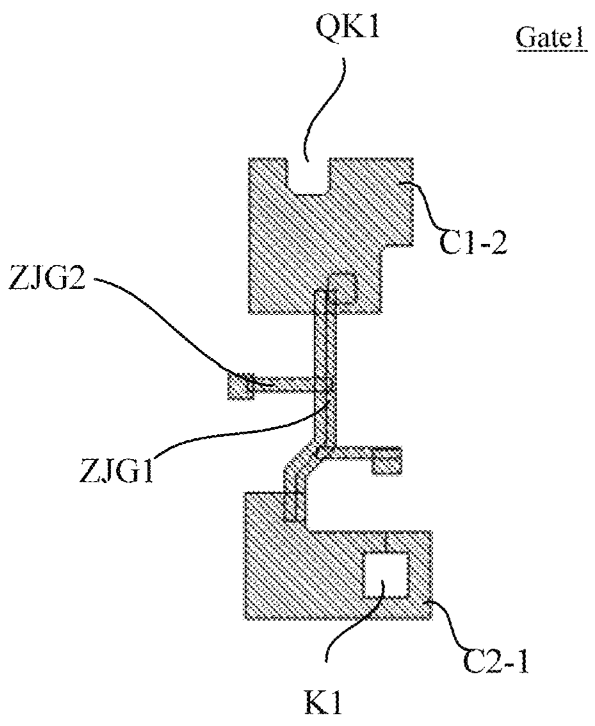

Referring to FIGS. 15, 17, 18 and 19, in other embodiments of the present disclosure, the pixel circuit DR shown in FIG. 6 may be varied, so that the pixel circuit DR may adapt to the desires of different display substrates.

In some specific embodiments, the first reset unit 180 is further coupled to the second reference signal line Vini2, and the first reset unit 180 is further used to couple the second reference signal line Vini2 to the second node N2 or decouple the second reference signal line Vini2 from the second node N2.

Different from the embodiment shown in FIG. 6, in this embodiment, the second reference signal V2 is provided through the second reference signal line Vini2, and the first reference signal V1 is provided through the first reference signal line Vini1, so that the second reference signal V2 and the first reference signal V1 are transmitted separately.

In some specific embodiments, the first reset unit 180 includes a first reset transistor T7 and a second reset transistor T8. The first electrode of the first reset transistor T7 is coupled to the first reference signal line Vini1, the second electrode of the first reset transistor T7 is coupled to the second node N2, and the gate electrode of the first reset transistor T7 is coupled to the first reset control line G5. The first electrode of the second reset transistor T8 is coupled to the second reference signal line Vini2, the second electrode of the second reset transistor T8 is coupled to the second node N2, and the gate electrode of the second reset transistor T8 is coupled to the second reset control line G6.

In an example, in this embodiment, the pixel circuit DR includes the above driving transistor DT, input transistor T1, third reset transistor T2, first light-emitting control transistor T3, threshold compensation transistor T4, second light-emitting control transistor T5, gating transistor T6, first reset transistor T7, second reset transistor T8, first capacitor C1 and second capacitor C2.

Figure 15:
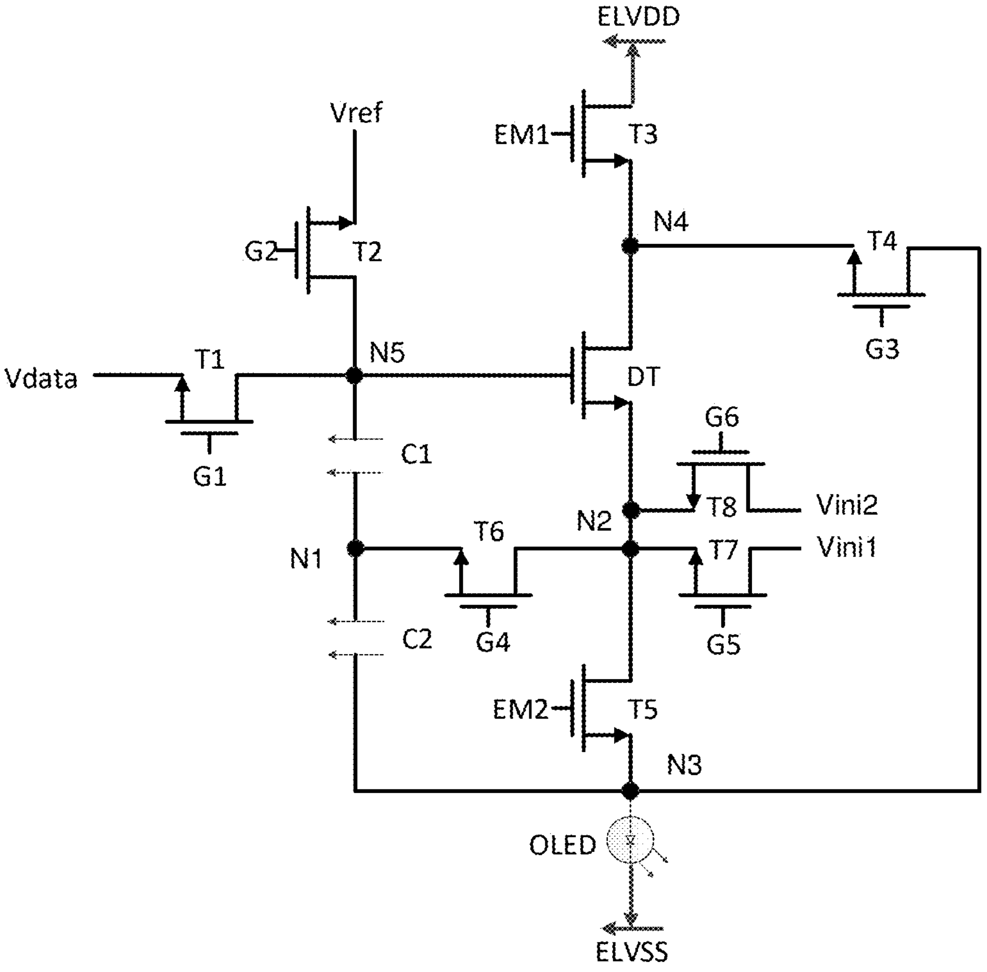
FIG. 15 schematically shows a schematic diagram of a pixel circuit in some exemplary embodiments of the present disclosure.
Figure 16:
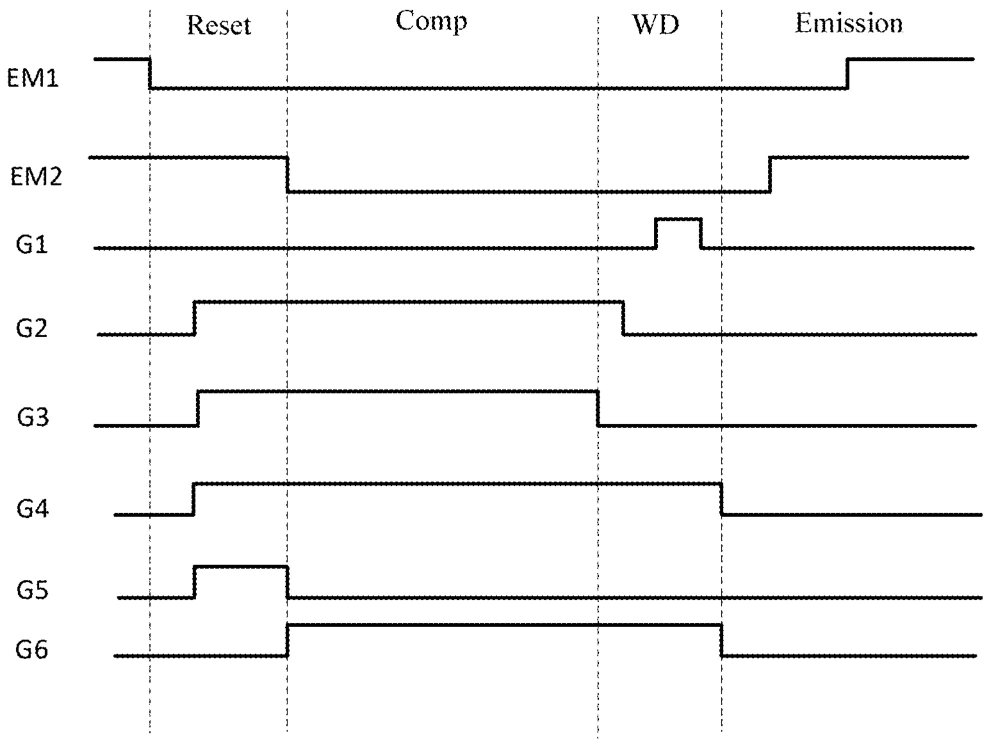
FIG. 16 shows a driving timing diagram corresponding to FIG. 15.

FIG. 16 shows a driving timing diagram corresponding to FIG. 15. Referring to FIG. 16, the driving timing in this embodiment is different from the driving timing shown in FIG. 5. Specifically, in this embodiment, in the reset phase Reset, an invalid signal is provided to the first reset control line G5, and a valid signal is provided to the second reset control line G6, so that the first reset transistor T7 is turned off, and the second reset transistor T8 is turned on, therefore the fourth node N4, the second node N2, the third node N3 and the first node N1 are reset to be at V2. In the threshold compensation phase Comp, a valid signal is provided to the first reset control line G5, and an invalid signal is provided to the second reset control line G6, so that the first reset transistor T7 is turned on, and the second reset transistor T8 is turned off, so that the fourth node N4, the second node N2, the third node N3 and the first node N1 are charged to be at V1. In addition, the driving timing of the remaining transistors is similar to the timing shown in FIG. 5, which will not be repeated here.

Figure 17:
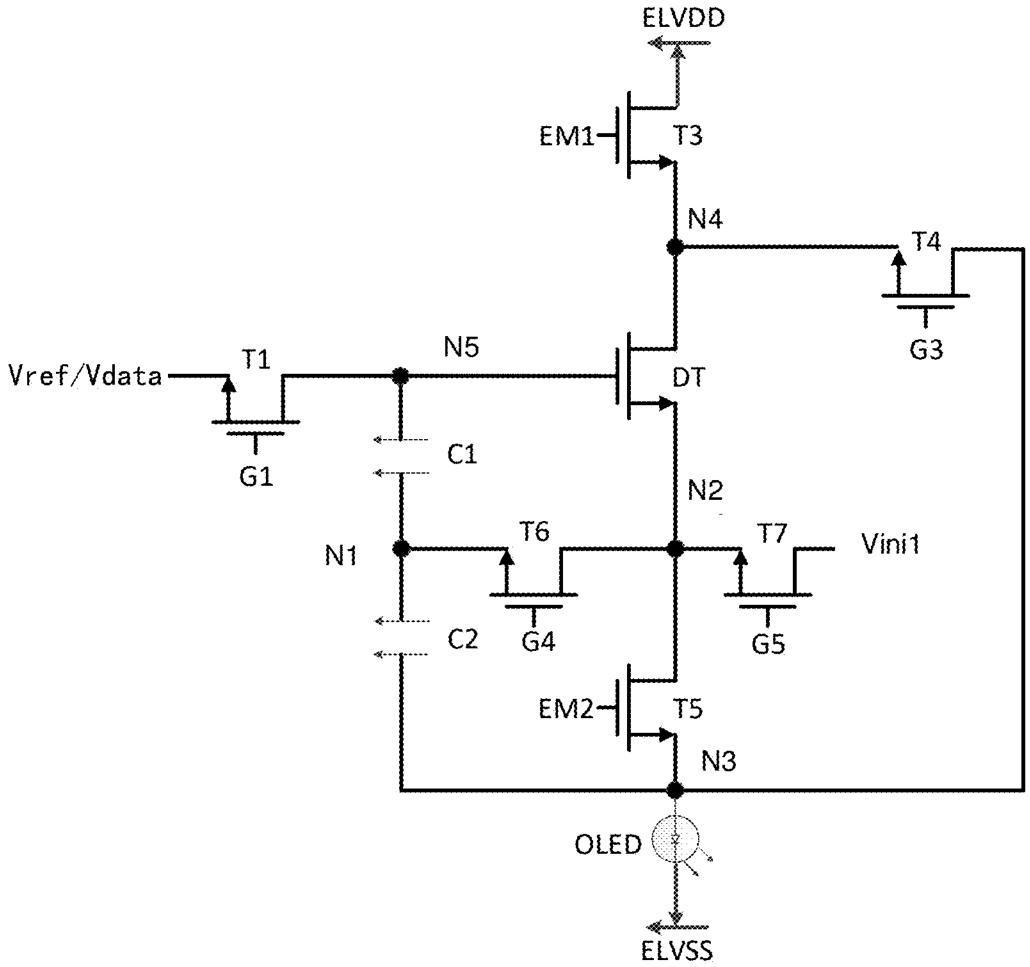
FIG. 17 schematically shows a schematic diagram of a pixel circuit in some exemplary embodiments of the present disclosure.

Referring to FIG. 17, in some other specific embodiments, the input unit 190 includes: an input transistor T1. The first electrode of the input transistor T1 is coupled to the third terminal of the driving unit 110, the second electrode of the input transistor T1 is coupled to the reset signal line Vref and the data line Vdata, and the gate electrode T1_GC of the input transistor T1 is coupled to the input control line G1. The reset signal line Vref and the data line Vdata are integrated.

Different from the embodiment shown in FIG. 6, in this embodiment, the input unit 190 uses only one transistor, and the data line Vdata and the reset signal line Vref provide signals to the input transistor T1 in different time periods.

In an example, in this embodiment, the pixel circuit DR includes the above driving transistor DT, input transistor T1, first light-emitting control transistor T3, threshold compensation transistor T4, second light-emitting control transistor T5, gating transistor T6, first reset transistor T7, first capacitor C1 and second capacitor C2.

The driving timing in this embodiment is different from the driving timing shown in FIG. 5. Specifically, in this embodiment, in the reset phase Reset, a valid signal is provided to the input control line G1, so that the input transistor T1 is turned on, and the fifth node N5 is reset to be at vref by the reset signal Vr. In the data writing phase WD, a valid signal continues to be provided to the input control line G1, so that the input transistor T1 remains in turned-on state, and the data voltage signal Data is written to the fifth node N5. In addition, the driving timing of the remaining transistors is similar to the timing shown in FIG. 5, which will not be repeated here.

Figure 18:
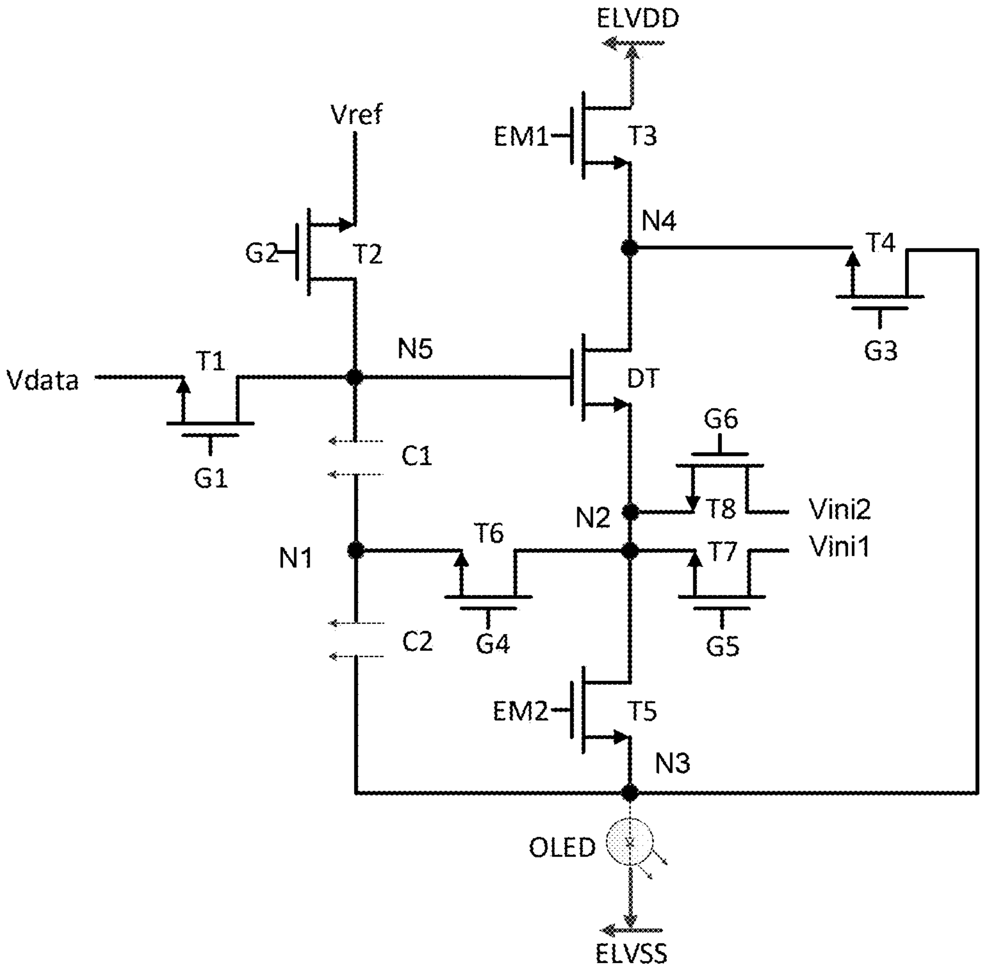
FIG. 18 schematically shows a schematic diagram of a pixel circuit in some exemplary embodiments of the present disclosure.

Referring to FIG. 18, in some other specific embodiments, the pixel circuit DR includes the above driving transistor DT, input transistor T1, first light-emitting control transistor T3, threshold compensation transistor T4, second light-emitting control transistor T5, gating transistor T6, first reset transistor T7, second reset transistor T8, first capacitor C1 and second capacitor C2.

The driving timing in this embodiment is different from the driving timing shown in FIG. 5. Specifically, in this embodiment, in the reset phase Reset, a valid signal is provided to the input control line G1 and the second reset control line G6, and an invalid signal is provided to the first reset control line G5, so that the input transistor T1 and the second reset transistor T8 are turned on, and the first reset transistor T7 is turned off. Thus, the fifth node N5 may be reset to be at Vr by the reset signal Vr, and the fourth node N4, the second node N2, the third node N3 and the first node N1 may be reset to be at V2 by the second reference signal V2.

In the threshold compensation phase Comp, an invalid signal is provided to the second reset control line G6, and a valid signal is provided to the first reset control line G5, so that the first reset transistor T7 is turned on, and the second reset transistor T8 is turned off, therefore the fourth node N4, the second node N2, the third node N3 and the first node N1 are charged to be at V1.

In the data writing phase WD, a valid signal continues to be provided to the input control line G1, so that the input transistor T1 is turned on, and the data voltage signal Data is written to the fifth node N5. In addition, the driving timing of the remaining transistors is similar to the timing shown in FIG. 5, which will not be repeated here.

Figure 19:
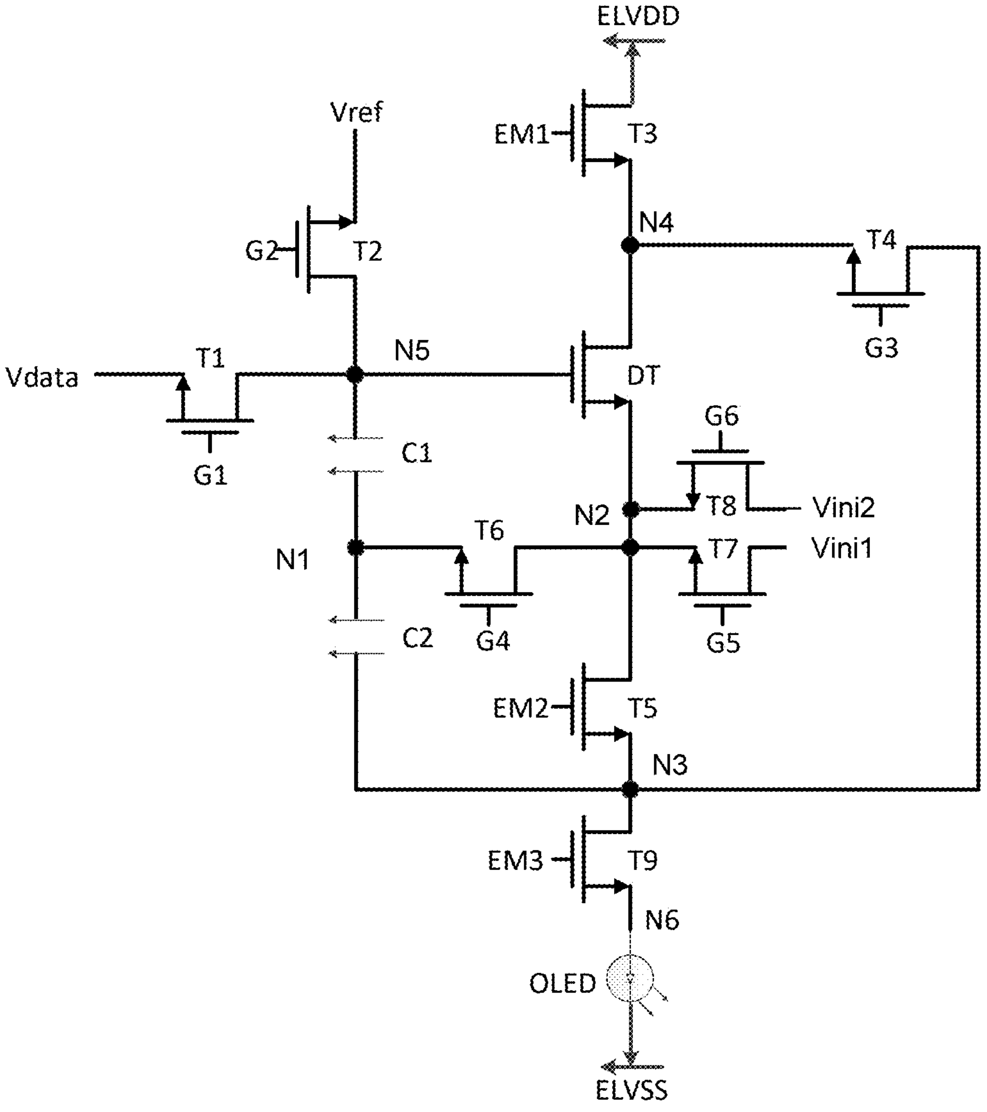
FIG. 19 schematically shows a schematic diagram of a pixel circuit in some exemplary embodiments of the present disclosure.

Referring to FIG. 19, in some other specific embodiments, the pixel circuit DR further includes a third light-emitting control unit 111 coupled between the third node N3 and the first electrode of the light-emitting element OLED, and the third light-emitting control unit 111 is used to couple the third node N3 to the first electrode of the light-emitting element OLED or decouple the third node N3 from the first electrode of the light-emitting element OLED.

Different from the embodiment shown in FIG. 6, in this embodiment, a third light-emitting control unit 111 is added, and the third light-emitting control unit 111 is used to couple the third node N3 to the first electrode of the light-emitting element OLED or decouple the third node N3 from the first electrode of the light-emitting element OLED. Thus, in the threshold compensation phase and data writing phase WD, the first electrode of the light-emitting element OLED may be decoupled from the third node N3, so that the voltage of the first electrode of the light-emitting element OLED maintains at the initial potential in this process. The initial potential here may refer to the potential reset to in the reset phase Reset. In addition, the first reset unit 180 includes a first reset transistor T7 and a second reset transistor T8.

In some specific embodiments, the third light-emitting control unit 111 includes a third light-emitting control transistor T9, a first electrode of the third light-emitting control transistor T9 is coupled to the third node N3, a second electrode of the third light-emitting control transistor T9 is coupled to the first electrode of the light-emitting element OLED, and a gate electrode of the third light-emitting control transistor T9 is coupled to the third light-emitting control line EM3.

In an example, in this embodiment, the pixel circuit DR includes the above driving transistor DT, input transistor T1, third reset transistor T2, first light-emitting control transistor T3, threshold compensation transistor T4, second light-emitting control transistor T5, gating transistor T6, first reset transistor T7, second reset transistor T8 and third light-emitting control transistor T9, first capacitor C1 and second capacitor C2.

Figure 20:
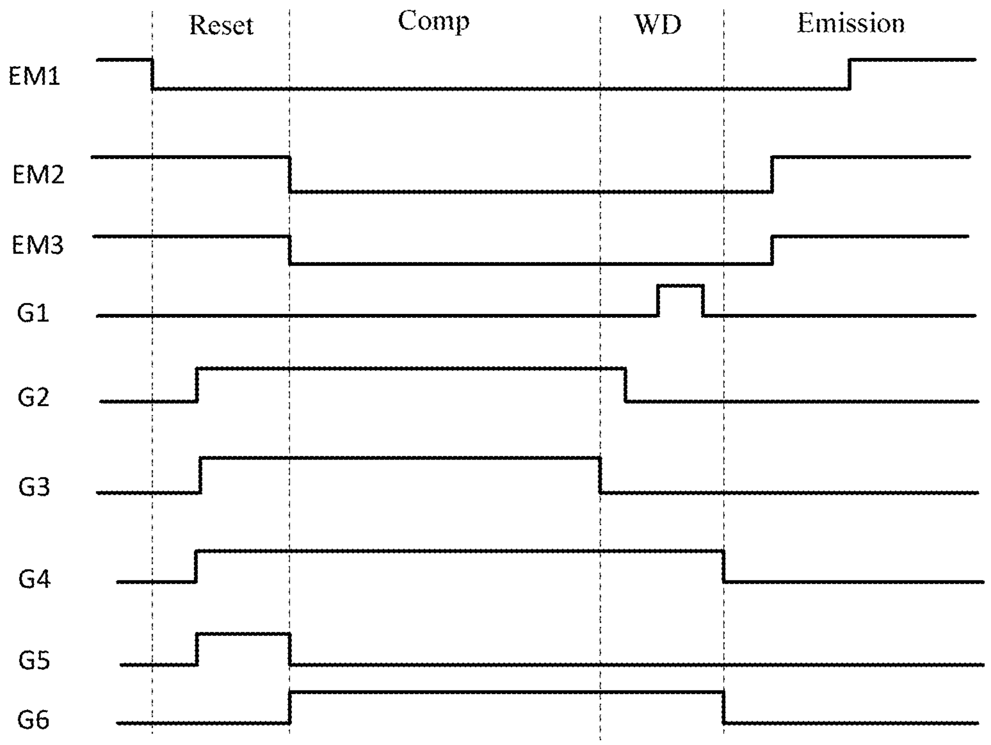
FIG. 20 shows a timing diagram corresponding to FIG. 19.

FIG. 20 shows a timing diagram corresponding to FIG. 19. Referring to FIG. 20, the driving timing in this embodiment is different from the driving timing shown in FIG. 5. Specifically, in this embodiment, in the reset phase Reset, an invalid signal is provided to the first reset control line G5, and a valid signal is provided to the third light-emitting control line EM3 and the second reset control line G6, so that the first reset transistor T7 is turned off, and the third light-emitting control transistor T9 and the second reset transistor T8 are turned on, therefore the fourth node N4, the second node N2, the third node N3 and the first node N1 and the first electrode of the light-emitting element OLED are reset to be at V2. In the threshold compensation phase Comp, a valid signal is provided to the first reset control line G5, and an invalid signal is provided to the third light-emitting control line EM3 and the second reset control line G6, so that the first reset transistor T7 is turned on, and the third light-emitting control transistor T9 and the second reset transistor T8 are turned off, therefore the fourth node N4, the second node N2, the third node N3 and the first node N1 are charged to be at V1. In addition, the driving timing of the remaining transistors is similar to the timing shown in FIG. 16, which will not be repeated here.

At least some embodiments of the present disclosure further provide a display substrate, which includes the pixel circuits DR in the above embodiments. The detailed structure of the display substrate may refer to the above embodiments, which will not be repeated here.

At least some embodiments of the present disclosure further provide a display device, which may include any device or product with a display function. For example, the display device may be a smart phone, a mobile phone, an e-book reader, a desktop computer (PC), a laptop PC, a netbook PC, a personal digital assistant (PDA), a portable multimedia player (PMP), a digital audio player, a mobile medical device, a camera, a wearable device (such as a head-mounted device, an electronic clothing, an electronic bracelet, an electronic necklace, an electronic accessory, an electronic tattoo, or a smart watch), a television, etc.

At least some embodiments of the present disclosure further provide a method for driving the pixel circuit DR in the above embodiments, and the method includes the followings.

In a threshold compensation phase Comp, an invalid signal is provided to the first light-emitting control unit 120, so that the first power line ELVDD is decoupled from the first terminal of the driving unit 110 by the first light-emitting control unit 120, an invalid signal is provided to the second light-emitting control unit 130, so that the second terminal of the driving unit 110 is decoupled from the first electrode of the light-emitting element OLED by the second light-emitting control unit 130, a valid signal is provided to the threshold compensation unit 140, so that the first terminal of the driving unit 110 is coupled to the first electrode of the light-emitting element OLED by the threshold compensation unit 140, and a valid signal is provided to the gating unit 170, so that the first reference signal line Vini1 is coupled to the first node N1 by the gating unit 170.

In a data writing phase WD, an invalid signal is provided to the threshold compensation unit 140, so that the first terminal of the driving unit 110 is decoupled from the first electrode of the light-emitting element OLED by the threshold compensation unit 140.

In a light-emitting phase Emission, a valid signal is provided to the first light-emitting control unit 120, so that the first power line ELVDD is coupled to the first terminal of the driving unit 110 by the first light-emitting control unit 120, and a valid signal is provided to the second light-emitting control unit 130, so that the second terminal of the driving unit 110 is coupled to the first electrode of the light-emitting element OLED by the second light-emitting control unit 130, and an invalid signal is provided to the gating unit 170, so that the first reference signal line Vini1 is decoupled from the first node N1 by the gating unit 170.

The incomplete description in embodiments of the present disclosure may refer to the above embodiments, which will not be repeated here.

It should be understood by those skilled in the art that the features described in the various embodiments of the present disclosure may be combined and/or combined in a variety of ways, even if such combinations and/or combinations are not explicitly described in the present disclosure. In particular, without departing from the spirit and teachings of the present disclosure, the features described in the various embodiments of the present disclosure may be combined and/or combined in a variety of ways. All of these combinations and/or combinations fall within the scope of the present disclosure.

Embodiments of the present disclosure are described above. However, these embodiments are only for illustrative purposes and are not intended to limit the scope of the present disclosure. Although embodiments are described above separately, this does not mean that the measures in the various embodiments may not be used in combination to advantage. The scope of the present disclosure is defined by the attached claims and their equivalents. Without departing from the scope of the present disclosure, those skilled in the art may make a variety of substitutions and modifications, which should all fall within the scope of the present disclosure.

What is claimed is:

1. A pixel circuit, comprising:

a driving unit comprising a first terminal, a second terminal and a third terminal, wherein the second terminal of the driving unit is coupled to a first electrode of a light-emitting element, and the driving unit is configured to provide a driving current to the light-emitting element in a light-emitting phase;

a first light-emitting control unit coupled between a first power line and the first terminal of the driving unit, and configured to couple the first power line to the first terminal of the driving unit or decouple the first power line from the first terminal of the driving unit;

a second light-emitting control unit coupled between the second terminal of the driving unit and the first electrode of the light-emitting element, and configured to couple the second terminal of the driving unit to the first electrode of the light-emitting element or decouple the second terminal of the driving unit from the first electrode of the light-emitting element;

a threshold compensation unit coupled between the first terminal of the driving unit and the first electrode of the light-emitting element, and configured to couple the first terminal of the driving unit to the first electrode of the light-emitting element or decouple the first terminal of the driving unit from the first electrode of the light-emitting element;

a first storage unit and a second storage unit, wherein the first storage unit and the second storage unit are coupled in series between the third terminal of the driving unit and the first electrode of the light-emitting element, and the first storage unit is coupled to the second storage unit at a first node; and a gating unit coupled between a first reference signal line and the first node, and configured to couple the first reference signal line to the first node or decouple the first reference signal line from the first node.

2. The pixel circuit according to claim 1, wherein the pixel circuit further comprises a first reset unit coupled between the gating unit and the first reference signal line, and wherein the first reset unit, the gating unit and the second terminal of the driving unit are coupled to each other at a second node; and the first reset unit is configured to couple the first reference signal line to the second node or decouple the first reference signal line from the second node.

3. The pixel circuit according to claim 2, wherein the first reset unit comprises: a first reset transistor, a first electrode of the first reset transistor is coupled to the first reference signal line, a second electrode of the first reset transistor is coupled to the second node, and a gate electrode of the first reset transistor is coupled to a first reset control line; and wherein the first reference signal line is configured to provide a second reference signal in a reset phase, and provide a first reference signal in a threshold compensation phase and a data writing phase.

4. The pixel circuit according to claim 2, wherein the first reset unit is further coupled to a second reference signal line, and the first reset unit is further configured to couple the second reference signal line to the second node or decouple the second reference signal line from the second node; and wherein the first reset unit comprises a first reset transistor and a second reset transistor;

a first electrode of the first reset transistor is coupled to the first reference signal line, a second electrode of the first reset transistor is coupled to the second node, and a gate electrode of the first reset transistor is coupled to a first reset control line; and a first electrode of the second reset transistor is coupled to the second reference signal line, a second electrode of the second reset transistor is coupled to the second node, and a gate electrode of the second reset transistor is coupled to a second reset control line.

5. The pixel circuit according to claim 3, wherein the gating unit comprises a gating transistor, a first electrode of the gating transistor is coupled to the second node, a second electrode of the gating transistor is coupled to the first node, and a gate electrode of the gating transistor is coupled to a gating control line; and wherein the gating control line and the first reset control line are integrated; or the gating control line and the first reset control line are insulated from each other and spaced apart.

6. The pixel circuit according to claim 1, wherein the pixel circuit further comprises an input unit coupled between a data line and the third terminal of the driving unit and configured to couple the data line to the third terminal of the driving unit or decouple the data line from the third terminal of the driving unit; and wherein the input unit is further coupled between a reset signal line and the third terminal of the driving unit, and the input unit is further configured to couple the reset signal line to the third terminal of the driving unit or decouple the reset signal line from the third terminal of the driving unit.

7. The pixel circuit according to claim 6, wherein the input unit comprises an input transistor and a third reset transistor;

a first electrode of the input transistor is coupled to the third terminal of the driving unit, a second electrode of the input transistor is coupled to the data line, and a gate electrode of the input transistor is coupled to an input control line; and a first electrode of the third reset transistor is coupled to the third terminal of the driving unit, a second electrode of the third reset transistor is coupled to the reset signal line, and a gate electrode of the third reset transistor is coupled to a third reset control line; and wherein the threshold compensation unit comprises a threshold compensation transistor, a first electrode of the threshold compensation transistor is coupled to the first electrode of the light-emitting element, a second electrode of the threshold compensation transistor is coupled to the first terminal of the driving unit, and a gate electrode of the threshold compensation transistor is coupled to a threshold compensation control line; and wherein the third reset control line and the threshold compensation control line are integrated; or the third reset control line and the threshold compensation control line are insulated from each other and spaced apart.

8. The pixel circuit according to claim 6, wherein the input unit comprises an input transistor, a first electrode of the input transistor is coupled to the third terminal of the driving unit, a second electrode of the input transistor is coupled to the reset signal line and the data line, and a gate electrode of the input transistor is coupled to an input control line.

9. The pixel circuit according to claim 1, wherein the first light-emitting control unit comprises a first light-emitting control transistor, a first electrode of the first light-emitting control transistor is coupled to the first power line, a second electrode of the first light-emitting control transistor is coupled to the first terminal of the driving unit, and a gate electrode of the first light-emitting control transistor is coupled to a first light-emitting control line; and the second light-emitting control unit comprises a second light-emitting control transistor, a first electrode of the second light-emitting control transistor is coupled to the second terminal of the driving unit, a second electrode of the second light-emitting control transistor is coupled to the first electrode of the light-emitting element, and a gate electrode of the second light-emitting control transistor is coupled to a second light-emitting control line.

10. The pixel circuit according to claim 1, wherein the first storage unit comprises a first capacitor, a first electrode plate of the first capacitor is coupled to the third terminal of the driving unit, and a second electrode plate of the first capacitor is coupled to the first node; and the second storage unit comprises a second capacitor, a first electrode plate of the second capacitor is coupled to the first node, and a second electrode plate of the second capacitor, the second light-emitting control unit, the threshold compensation unit and the first electrode of the light-emitting element are coupled to each other at a third node;

wherein the pixel circuit further comprises a third light-emitting control unit coupled between the third node and the first electrode of the light-emitting element and configured to couple the third node to the first electrode of the light-emitting element or decouple the third node from the first electrode of the light-emitting element; and wherein the third light-emitting control unit comprises a third light-emitting control transistor, a first electrode of the third light-emitting control transistor is coupled to the third node, a second electrode of the third light-emitting control transistor is coupled to the first electrode of the light-emitting element, and a gate electrode of the third light-emitting control transistor is coupled to a third light-emitting control line.

11. The pixel circuit according to claim 1, wherein the driving unit comprises a driving transistor, and the driving transistor comprises an oxide thin film transistor;

a first electrode of the driving transistor serves as the first terminal of the driving unit, a second electrode of the driving transistor serves as the second terminal of the driving unit, and a gate electrode of the driving transistor serves as the third terminal of the driving unit.

12. The pixel circuit according to claim 1, wherein the pixel circuit further comprises a first substrate, the driving unit comprises a driving transistor, the first light-emitting unit comprises a first light-emitting control transistor, the second light-emitting control unit comprises a second light-emitting control transistor, the threshold compensation unit comprises a threshold compensation transistor, the gating unit comprises a gating transistor, and the first storage unit comprises a first capacitor; and an orthographic projection of the first light-emitting control transistor on the first substrate and an orthographic projection of the threshold compensation transistor on the first substrate are arranged in a first direction, and orthographic projections of the driving transistor, the first capacitor, the second light-emitting control transistor and the gating transistor on the first substrate are located between the orthographic projection of the first light-emitting control transistor on the first substrate and the orthographic projection of the threshold compensation transistor on the first substrate.

13. The pixel circuit according to claim 12, wherein a second electrode of the first light-emitting control transistor is coupled to a second electrode of the threshold compensation transistor through a first connecting portion, and orthographic projections of the first light-emitting control transistor, the driving transistor, the first capacitor, the second light-emitting control transistor, the gating transistor and the threshold compensation transistor on the first substrate are located on a same side of an orthographic projection of the first connecting portion on the first substrate.

14. The pixel circuit according to claim 12, wherein an orthographic projection of the driving transistor on the first substrate overlaps with an orthographic projection of the first capacitor on the first substrate.

15. The pixel circuit according to claim 12, wherein the second storage unit comprises a second capacitor, an orthographic projection of the first capacitor on the first substrate and an orthographic projection of the second capacitor on the first substrate are arranged in the first direction, and orthographic projections of the second light-emitting control transistor and the gating transistor on the first substrate are located between the orthographic projection of the first capacitor on the first substrate and the orthographic projection of the second capacitor on the first substrate.

16. The pixel circuit according to claim 15, wherein the orthographic projection of the threshold compensation transistor on the first substrate overlaps with the orthographic projection of the second capacitor on the first substrate.

17. The pixel circuit according to claim 13, wherein an orthographic projection of the gating transistor on the first substrate is located between an orthographic projection of the second light-emitting control transistor on the first substrate and an orthographic projection of the driving transistor on the first substrate; and a second electrode of the driving transistor, a first electrode of the second light-emitting control transistor and a second electrode of the driving transistor are coupled through a second connecting portion, the orthographic projection of the gating transistor on the first substrate is located between an orthographic projection of the second connecting portion on the first substrate and the orthographic projection of the first connecting portion on the first substrate, and a first electrode of the gating transistor is coupled to the second connecting portion through a third connecting portion; or wherein the pixel circuit further comprises an input unit, the input unit comprises an input transistor, an orthographic projection of the input transistor on the first substrate is located on a side of an orthographic projection of the first capacitor on the first substrate away from the orthographic projection of the first light-emitting control transistor on the first substrate, and an orthographic projection of the gating transistor on the first substrate is located between the orthographic projection of the input transistor on the first substrate and the orthographic projection of the first connecting portion on the first substrate; and wherein the input unit further comprises a third reset transistor, an orthographic projection of the third reset transistor on the first substrate is located on a side of the orthographic projection of the first capacitor on the first substrate facing the orthographic projection of the first light-emitting control transistor on the first substrate, and the orthographic projection of the first light-emitting control transistor on the first substrate is located between the orthographic projection of the third reset transistor on the first substrate and the orthographic projection of the first connecting portion on the first substrate.

18. The pixel circuit according to claim 15, wherein the second capacitor comprises a first electrode plate and a second electrode plate, the second electrode plate is located on a side of the first electrode plate facing the first substrate, the first electrode plate of the second capacitor is provided with a first opening, and the first opening exposes the second electrode plate of the second capacitor;

an orthographic projection of the first opening on the first substrate and the orthographic projection of the threshold compensation transistor on the first substrate are arranged in a second direction intersecting the first direction, a first electrode of the threshold compensation transistor is coupled to a second electrode of the second light-emitting control transistor and coupled to a fourth connecting portion, and the second connecting portion is located on a side of the first electrode plate of the second capacitor away from the first substrate; and a part of the fourth connecting portion passes through the first opening and is coupled to the second electrode plate of the second capacitor; and wherein the pixel circuit further comprises a first reset unit, the first reset unit further comprises a first reset transistor, an orthographic projection of the first reset transistor on the first substrate is located on a side of the orthographic projection of the second capacitor on the first substrate facing the orthographic projection of the first light-emitting control transistor on the first substrate, and the orthographic projection of the first reset transistor on the first substrate and the orthographic projection of the first opening on the first substrate are arranged in the first direction.

19. A display substrate, comprising the pixel circuit according to claim 1.

20. A method for driving the pixel circuit according to claim 1, the method comprising:

in a threshold compensation phase, providing an invalid signal to the first light-emitting control unit so that the first power line is decoupled from the first terminal of the driving unit by the first light-emitting control unit, providing an invalid signal to the second light-emitting control unit so that the second terminal of the driving unit is decoupled from the first electrode of the light-emitting element by the second light-emitting control unit, providing a valid signal to the threshold compensation unit so that the first terminal of the driving unit is coupled to the first electrode of the light-emitting element by the threshold compensation unit, and providing a valid signal to the gating unit so that the first reference signal line is coupled to the first node by the gating unit;

in a data writing phase, providing an invalid signal to the threshold compensation unit so that the first terminal of the driving unit is decoupled from the first electrode of the light-emitting element by the threshold compensation unit; and in a light-emitting phase, providing a valid signal to the first light-emitting control unit so that the first power line is coupled to the first terminal of the driving unit by the first light-emitting control unit, and providing a valid signal to the second light-emitting control unit so that the second terminal of the driving unit is coupled to the first electrode of the light-emitting element by the second light-emitting control unit, and providing an invalid signal to the gating unit so that the first reference signal line is decoupled from the first node by the gating unit.

* * * * *